(12) United States Patent
Arai et al.

(10) Patent No.: US 12,093,142 B2
(45) Date of Patent: Sep. 17, 2024

(54) COMPUTER SYSTEM AND DATA CONTROL METHOD

(71) Applicant: Hitachi, Ltd., Tokyo (JP)

(72) Inventors: Masahiro Arai, Tokyo (JP); Akira Deguchi, Tokyo (JP); Hideyuki Koseki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 15 days.

(21) Appl. No.: 18/119,336

(22) Filed: Mar. 9, 2023

(65) Prior Publication Data

US 2024/0111638 A1   Apr. 4, 2024

(30) Foreign Application Priority Data

Sep. 29, 2022   (JP) ................. 2022-156456

(51) Int. Cl.
    *G06F 11/14*     (2006.01)
    *G06F 11/20*     (2006.01)

(52) U.S. Cl.
    CPC ...... *G06F 11/1469* (2013.01); *G06F 11/1464* (2013.01); *G06F 11/2023* (2013.01)

(58) Field of Classification Search
    CPC ............. G06F 11/1469; G06F 11/1464; G06F 11/2023
    See application file for complete search history.

(56) References Cited

U.S. PATENT DOCUMENTS

| | | | |
|---|---|---|---|
| 6,694,447 B1 * | 2/2004 | Leach | G06F 11/2048 714/15 |
| 11,327,679 B2 * | 5/2022 | Xiong | G06F 3/064 |
| 2011/0078494 A1 | 3/2011 | Maki et al. | |
| 2011/0179188 A1 | 7/2011 | Nakagawa et al. | |
| 2021/0240351 A1 | 8/2021 | Yokoi et al. | |
| 2021/0334181 A1 | 10/2021 | Satoyama et al. | |

FOREIGN PATENT DOCUMENTS

| | | |
|---|---|---|
| JP | 2011-76128 A | 4/2011 |
| JP | 2012-531654 A | 12/2012 |
| JP | 2021-124889 A | 8/2021 |
| JP | 2021-174392 A | 11/2021 |

\* cited by examiner

*Primary Examiner* — Nadeem Iqbal
(74) *Attorney, Agent, or Firm* — MATTINGLY & MALUR, PC

(57) ABSTRACT

In failover processing, a CPU restores data stored in a first volume to a second volume of a storage system, associates a unique ID of the first volume with the second volume, and stores the unique ID associated therewith in a memory. After the failover processing is completed, the CPU manages an update difference management bitmap indicating an updated content with respect to data stored in the second volume. The CPU transmits, in failback processing, update data updated after the failover processing among the data stored in the second volume to the first volume identified by the unique ID associated with the second volume based on the update difference management bitmap.

7 Claims, 33 Drawing Sheets

FIG. 7

| LOGICAL VOLUME LIST | | | | D101 |
|---|---|---|---|---|
| ☐ Volume Name | Capacity | Used | Health | |
| ■ #12: VolumeA01 | 32TB | 25% | Good | |
| ☐ #13: VolumeA02 | 54TB | 12% | Good | |
| ☐ #7F: SystemVolumeB | 16TB | 31% | Good | |
| ☐ #90: SystemVolumeC | 8TB | 4% | Good | |
| ☐ #A0: TestVolume | 8TB | 0% | Good | |

D102  D103

[ + ]  [ − ]

D104

| VOLUME NAME | VolumeA01 |
|---|---|
| APPARATUS PRODUCT NUMBER | VSP56342 |
| VOLUME NUMBER | 12 |
| USAGE AMOUNT / PROVISIONING SIZE | 8.0TB/32.0TB (25%) |
| STORAGE POOL | Storage Pool Y (328TB Available) |
| BACKUP | OFF |
| LAST BACKUP DATE AND TIME | - |
| UNIQUE ID | 0000-VSP56342-12 |

D105

[ OK ]

D100 VOLUME MANAGEMENT SCREEN

FIG. 9

D11 REGISTERED STORE LIST SCREEN

REGISTERED STORE LIST
- ○ ams: test Backup — D111
- ○ ABC Cloud: 2ndcopy — D111

D112 [+]  D113 [-]

D12 NEW STORE REGISTRATION SCREEN

NEW STORE REGISTRATION

| Field | Value | |
|---|---|---|
| Cloud Service | ams ▼ | D121 |
| Name | std Backup | D122 |
| Region | Asia-Tokyo ▼ | D123 |
| Access ID | AF37D7GDK | D124 |
| Secret Key | *************** | D125 |
| Bucket Name | (Auto: VSP56342) | D126 |
| Encryption | ● SSE   ○ KMS   ○ SSE-C | D127 |

D128 [Tag]   D129 [OK]   D130 [Cancel]

D10 OBJECT STORE REGISTRATION SCREEN

FIG. 10

```
BACKUP SETTING      D301
  ▼ Select Volumes

☐ #12: VolumeA01(32TB)
    ☐ #13: VolumeA02(32TB)
    ☑ #7F: SystemVolumeB(16TB)
    ☐ #90: SystemVolumeC(8TB)

▼ Select Object Store  D302

[ ams: std Backup              ▼ ]

D303
  ▼ Backup Schedule

○ One shot   D3031
       ○ Now     ○ [ 00:00 ]

● Periodically   D3032

● Daily    Start At [ 00:00 ]
       ○ Weekly   ☑ Every  [ 30 ]  minutes
       ○ Monthly  ☐ Max.   [ 47 ]  times ▼ Backup Method   D304

○ Full Backup
    ● Incremental Backup
    ○ Differential Backup    D311      D312

[  OK  ]  [ Cacnel ]
```

D30 BACKUP SETTING SCREEN

B23 BACKUP DATA (OBJ Key : VSP56342-v7f-s01-obj001.dat)

FIG. 13

| Bitmap Size | 400,000,000B | M231 |
| --- | --- | --- |
| Bitmap | 1100110111011011010111101111010000001 0101010110101101010101011101010110b..... | M232 |
| Data OBJ0 | VP56342-v7f-s02-obj001.dat | M233 |
| Length | 64,64,64,64,64,64,... | M234 |
| Data OBJ1 | VSP56342-v7f-s02-obj002.dat | M233 |
| Length | ... | M244 |
| Data OBJ2 | ... | M233 |
| Length | ... | M234 |

M23 METADATA (OBJ Key : VSP56342-v7f-s02.meta)

*FIG. 14*

| APPARATUS PRODUCT NUMBER | VSP56342 | 231 |
| --- | --- | --- |
| BACKUP VOLUME NUMBER | 0x7f | 232 |
| USAGE AMOUNT / PROVISIONING SIZE | 12.8TB/16.0TB | 233 |
| BACKUP GENERATION NUMBER | 02 | 234 |
| BACKUP ACQUISITION DATE AND TIME | 2021-04-28 21:00:17 | 235 |
| OBJ Key OF METADATA | VSP56342-v7f-s02.meta | 236 |
| OBJ Key OF NEW CATALOG | VSP56342-v7f-s01.catalog | 237 |
| UNIQUE ID | 0000-VSP56342-7F | 238 |

C23a CATALOG DATA(VSP564342-v7f-s02.catalog)

| APPARATUS PRODUCT NUMBER | VSP56342 | 231 |
| --- | --- | --- |
| BACKUP VOLUME NUMBER | 0x7f | 232 |
| USAGE AMOUNT / PROVISIONING SIZE | 11.5TB/16.0TB | 233 |
| BACKUP GENERATION NUMBER | 01 | 234 |
| BACKUP ACQUISITION DATE AND TIME | 2021-04-28 18:00:14 | 235 |
| OBJ Key OF METADATA | VSP56342-v7f-s01.meta | 236 |
| OBJ Key OF NEW CATALOG | - | 237 |
| UNIQUE ID | 0000-VSP56342-7F | 238 |

C23b CATALOG DATA (VSP56342-v7f-s01.catalog)

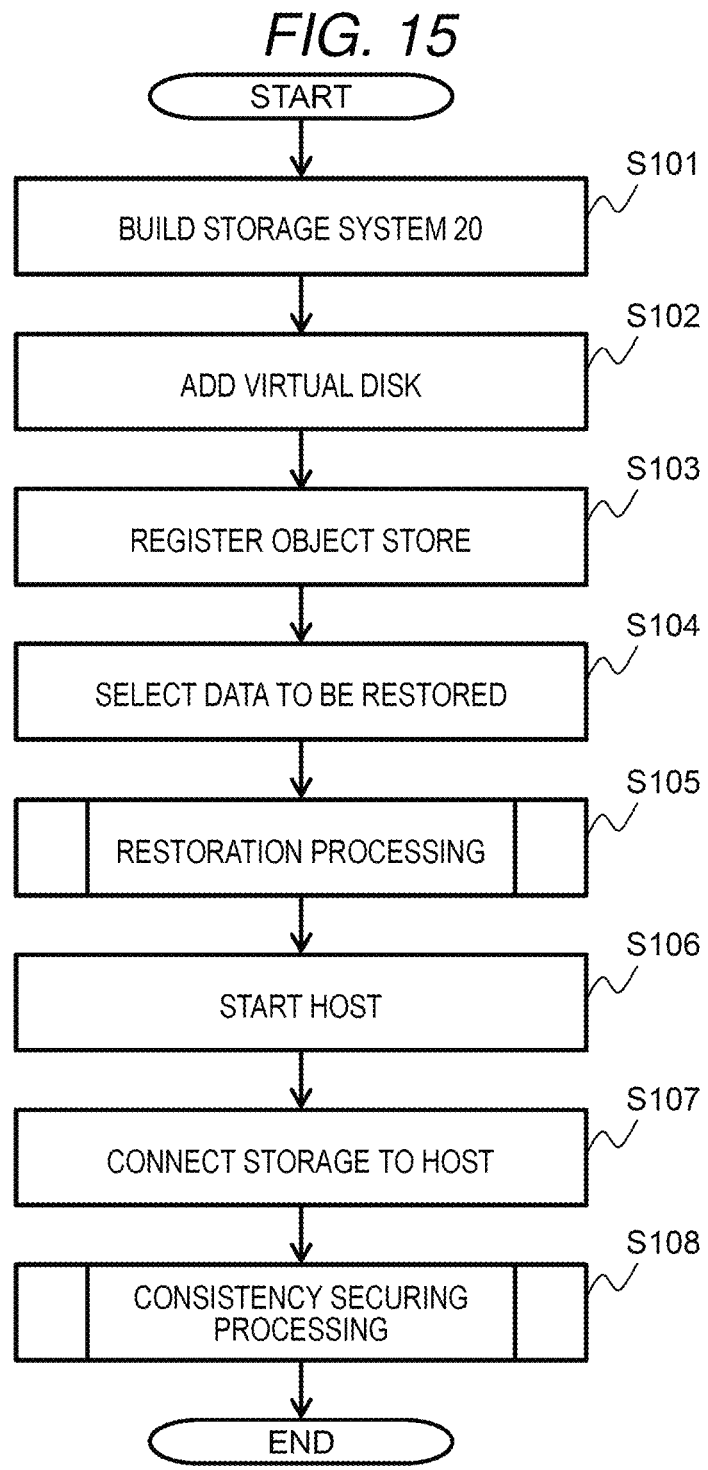

FIG. 16

RESTORE SELECTION

▼ Select Object Store — D401

[ ams: std Backup ▼ ]

▼ Select Backups — D402

┌─────────────────────────────────┐
│ ▼ VSP56342                      │
│   ☑ #7F: SystemVolumeB(16TB)    │
│   ☐ #90: SystemVolumeC(8TB)     │
│     ⋮                           │
└─────────────────────────────────┘

▼ Select Versions — D403

┌─────────────────────────────────┐
│ ○ #7F: Backup 01 / 2021-04-28 18:00 │
│ ◉ #7F: Backup 02 / 2021-04-28 22:00 │
│                                 │
│                                 │
└─────────────────────────────────┘

▼ Select Restore Target — D404

○ Original Volume — D4041
◉ New Volume — D4042

┌─────────────────────────────────┐
│ ○ Storage Pool J (162TB Available) │
│ ◉ Storage Pool K (105TB Available) │
│ ○ Storage Pool L (30TB Available)  │
│   ⋮                             │
└─────────────────────────────────┘

[ Restore ] — D411     [ Cancel ] — D412

D40 RESTORATION DATA SELECTION SCREEN

FIG. 18

| LOGICAL VOLUME LIST | | | | D101 |
|---|---|---|---|---|
| ☐ Volume Name | Capacity | Used | Health | |
| ■ #01: SystemVolumeB_re... | 16TB | 31% | Good | |

D102  D103

[ + ]  [ - ]

D104

| VOLUME NAME | SystemVolumeB_restored |
|---|---|
| APPARATUS PRODUCT NUMBER | VSS12345 |
| VOLUME NUMBER | 0x01 |
| USAGE AMOUNT / PROVISIONING SIZE | 5.0TB/16.0TB (31%) |
| STORAGE POOL | Storage Pool K (100TB Available) |
| BACKUP | OFF |
| LAST BACKUP DATE AND TIME | - |
| UNIQUE ID | 0000-VSP56342-7F |

D105

[ OK ]

D100a VOLUME MANAGEMENT SCREEN

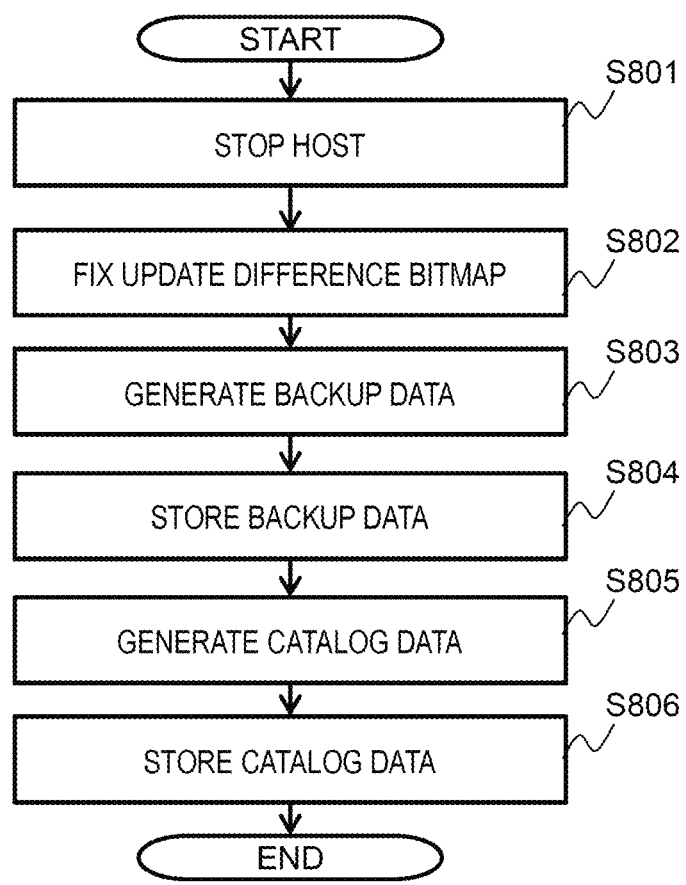

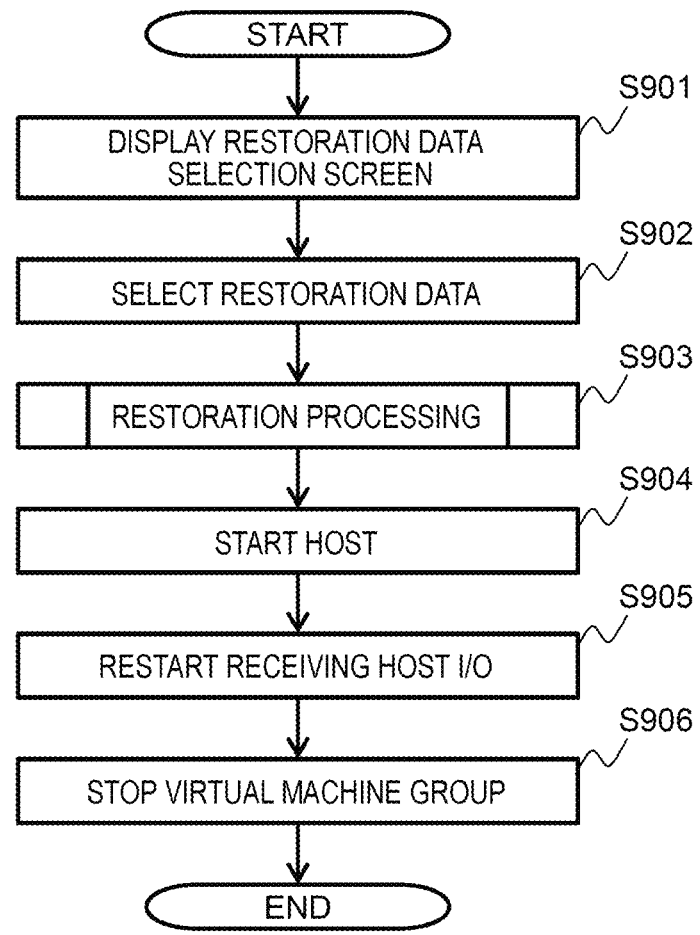

FIG. 32

RESTORE SELECTION

▼ Select Object Store  D401

[ ams: std Backup ▼ ]

▼ Select Backups  D402

▼ VSP56342
  ☐ #7F: SystemVolumeB(16TB)
  ☐ #90: SystemVolumeC(8TB)
  ⋮
▼ VSS12345
  ☑ #10: SystemVolumeB_restored(16TB)

▼ Select Versions  D403

⦿ #10: Backup 03 / 2021-05-03 18:00

▼ Select Restore Target  D404

⦿ Original Volume — D4041
○ New Volume — D4042

○ Storage Pool X (42TB Available)
⦿ Storage Pool Y (200TB Available)
○ Storage Pool Z (300TB Available)
⋮

D411   D412

[ Restore ]   [ Cancel ]

D40a RESTORATION DATA SELECTION SCREEN

FIG. 33

| | | |
|---|---|---|
| APPARATUS PRODUCT NUMBER | VSS12345 | 231 |
| BACKUP VOLUME NUMBER | 0x01 | 232 |
| Volume USAGE AMOUNT / PROVISIONING SIZE | 12.8TB/16.0TB | 233 |
| BACKUP GENERATION NUMBER | 03 | 234 |
| BACKUP ACQUISITION DATE AND TIME | 2021-05-03 18:00 | 235 |
| OBJ Key OF META | VSP56342-v7f-s03.meta | 236 |
| OBJ Key OF NEW CATALOG | VSP56342-v7f-s02.catalog | 237 |
| UNIQUE ID | 0000-VSP56342-7F | 238 |

C23c CATALOG DATA (VSP564342-v7f-s02.catalog)

COMPUTER SYSTEM AND DATA CONTROL METHOD

CROSS-REFERENCE TO RELATED APPLICATION

The present application claims priority from Japanese application JP2022-156456, filed on Sep. 29, 2022, the contents of which is hereby incorporated by reference into this application.

BACKGROUND OF THE INVENTION

1. Field of the Invention

The present disclosure relates to a computer system and a data control method.

2. Description of Related Art

For the purpose of disaster recovery or the like, a storage system has a function of performing failover processing in which business processing performed at a primary site such as an on-premise system built in a user's data center or the like is promptly resumed by using a secondary site provided separately from the primary site. In this type of storage system, when the primary site is normally recovered, failback processing is performed to return the business processing from the secondary site to the primary site.

In JP2021-124889A, disclosed is a technique configured to accumulate data and operations processed at the secondary site after execution of the failover processing as a secondary site journal and to restore a volume used at the primary site by using the secondary site journal when the failback processing is performed.

The technique disclosed in JP2021-124889A does not define information indicating a correspondence relationship between a volume of a primary site and a volume of a secondary site. Therefore, there is a problem in that, when data is copied from the secondary site to the primary site during failback processing, it is required to copy all the data corresponding to the volume of the secondary site, which takes time to perform the failback processing.

SUMMARY OF THE INVENTION

An object of the present disclosure is to provide a computer system and a data control method capable of shortening the time required for failback processing.

A computer system according to one aspect of the present disclosure includes a first storage system, a second storage system, and a management apparatus configured to manage the first storage system and the second storage system. The management apparatus includes a memory and a processor. The memory stores, for each first volume, identification information that uniquely identifies the first volume of the first storage system in the entire computer system. The processor is configured to, in failover processing from the first storage system to the second storage system, restore data stored in the first volume to a second volume of the second storage system, associate the identification information of the first volume with the second volume, and store the identification information associated therewith in the memory, to manage update information indicating an updated content with respect to data stored in the second volume after the failover processing is completed, and to transmit, in failback processing from the second storage system to the first storage system, update data updated after the failover processing among the data stored in the second volume to the first volume identified by the identification information associated with the second volume based on the update information.

According to the present invention, it is possible to shorten the time required for failback processing.

BRIEF DESCRIPTION OF THE DRAWINGS

FIG. 7 is a diagram showing an example of a volume management screen;

FIG. 9 is a diagram showing an example of an object store registration screen;

FIG. 10 is a diagram showing an example of a backup setting screen;

FIG. 13 is a diagram showing an example of metadata;

FIG. 14 is a diagram showing an example of catalog data;

FIG. 15 is a flowchart showing an example of failover processing;

FIG. 16 is a diagram showing an example of a restoration data selection screen;

FIG. 18 is a diagram showing an example of a volume management screen;

FIG. 30 is a diagram showing another example of the failback processing;

FIG. 31 is a diagram showing another example of the failback processing;

FIG. 32 is a diagram showing another example of the restoration data selection screen; and FIG. 33 is a diagram showing another example of the catalog data.

DESCRIPTION OF EMBODIMENTS

Hereinafter, embodiments of the present disclosure will be described with reference to the drawings. It should be noted that the embodiments described below do not limit the disclosure of the scope of the claims, and not all of the elements and combinations thereof described in the embodiments are necessary for solution of the present disclosure.

In addition, in the following descriptions, processing may be described with a "program" as the subject, but the program is executed by a processor (for example, central processing unit (CPU)), and the same performs predetermined processing while appropriately using a storage resource (for example, memory) and/or a communication interface device (for example, network interface card (NIC)). Accordingly, the subject of processing may be processing performed by a processor or a computer having a processor.

First Embodiment

Figure 1:
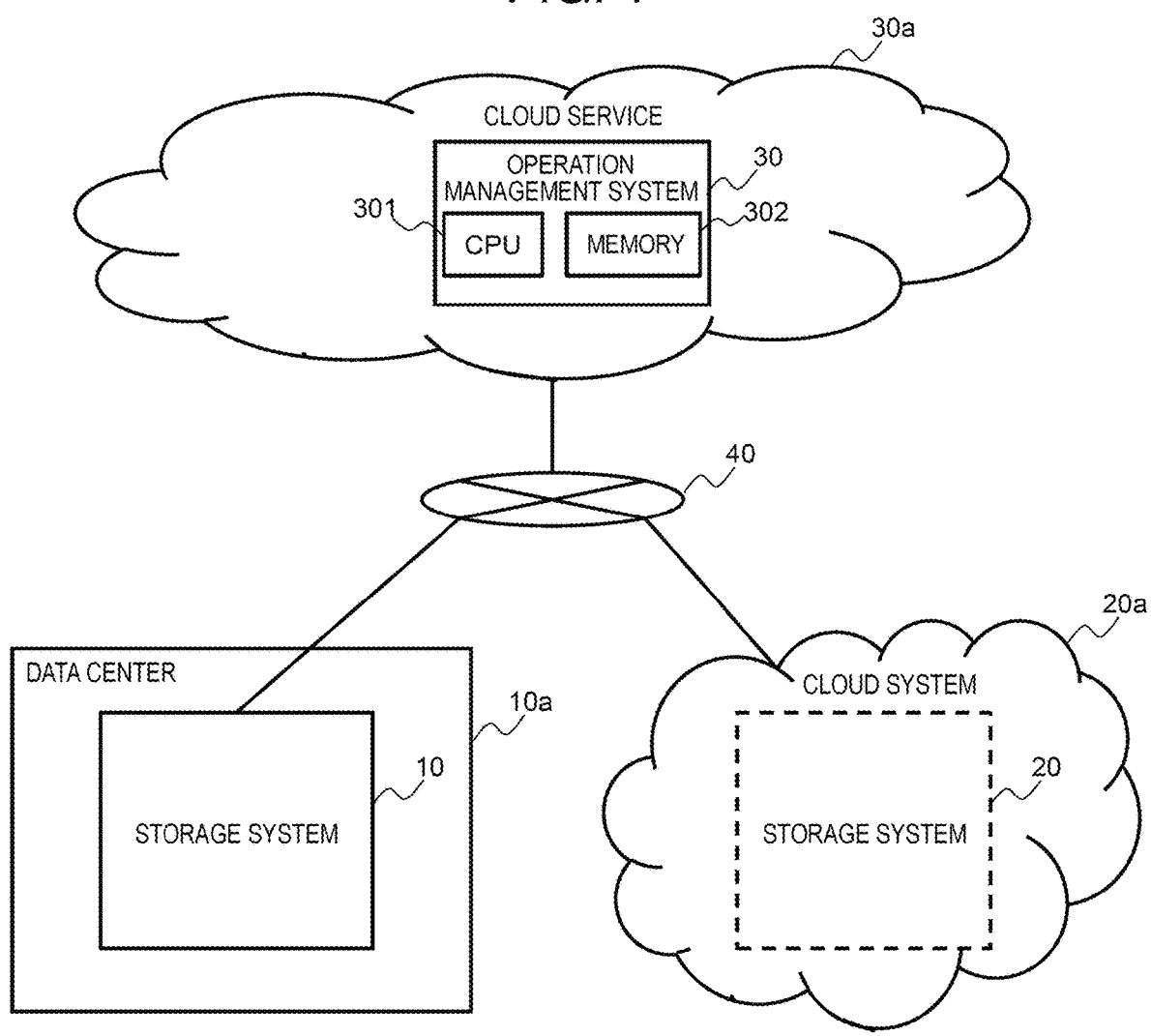
FIG. 1 is a diagram showing an overall configuration of a computer system according to a first embodiment of the present disclosure.

FIG. 1 is a diagram showing an overall configuration of a computer system according to a first embodiment of the present disclosure. The computer system shown in FIG. 1 includes a storage system 10, which is a first storage system functioning as a primary site, a storage system 20, which is a second storage system functioning as a secondary site, and an operation management system 30, which is a management apparatus that manages the storage systems 10 and 20, and the above-described systems are connected to each other via a network 40 so as to be able to communicate with each other.

In this embodiment, the storage system 10 is a physical storage system disposed in a data center 10a, and the storage system 20 is a virtual storage system implemented by software on a cloud system 20a. In addition, the storage system 20 is not installed permanently, but is installed as needed in the event of a disaster, such as a case where the storage system 10 does not function normally due to a disaster, which is indicated by a dotted line to represent the above description. However, the storage systems 10 and 20 are not limited to this example in FIG. 1.

A function of the operation management system 30 is provided as a cloud service 30a with respect to the storage systems 10 and 20. The operation management system 30 has a CPU 301, which is a processor configured to execute programs and perform various processing, and a memory 302 configured to store programs and various information. The CPU 301 reads a program recorded in the memory 302, executes the read program to perform various processing, and provides various functions. It is noted that the operation management system 30 may provide a part or all of the cloud services 30a.

Figure 2:
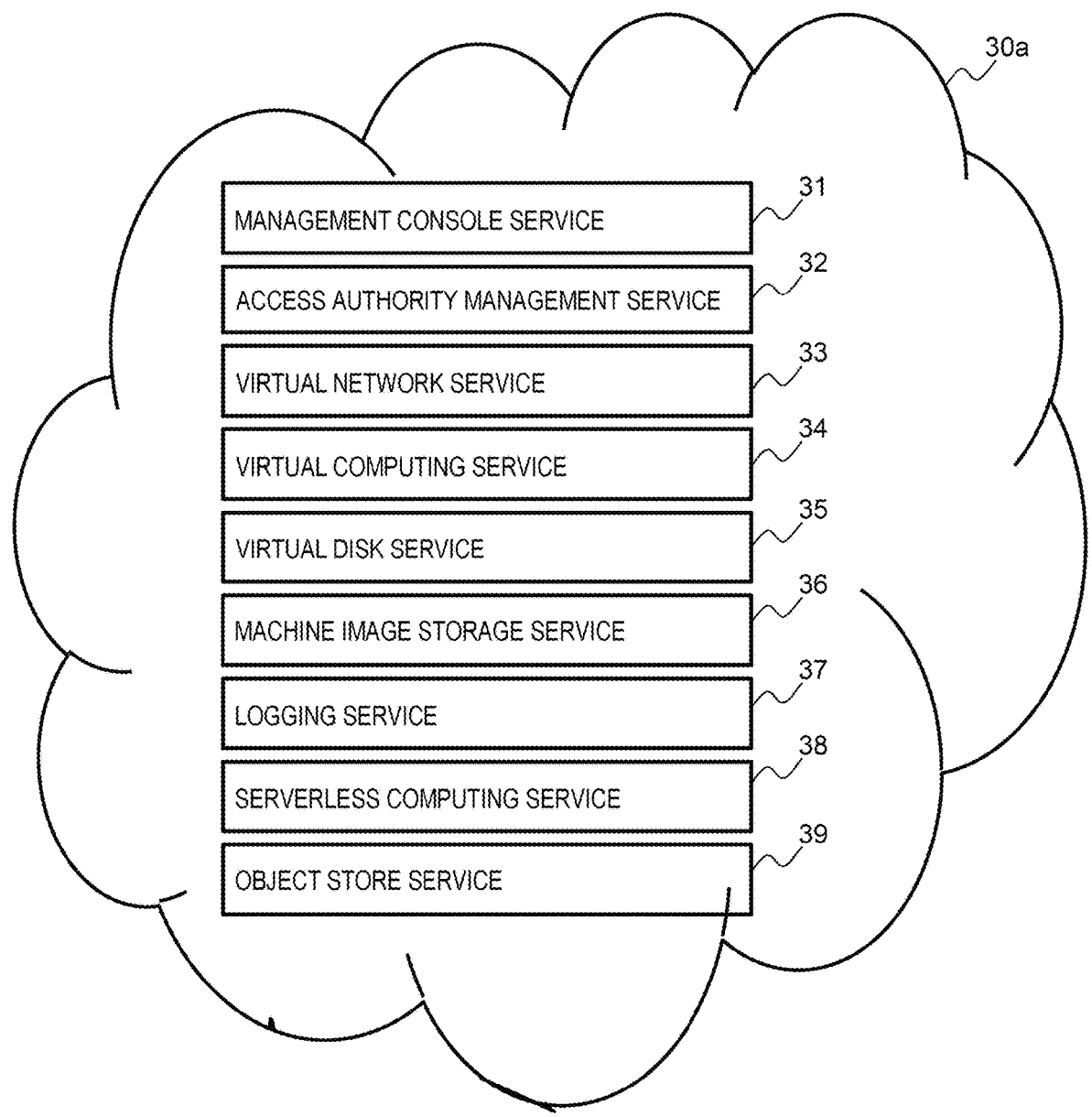
FIG. 2 is a diagram showing an example of a cloud service.

FIG. 2 is a diagram showing an example of the cloud service 30a. The cloud service 30a shown in FIG. 2 includes a management console service 31 that performs an input and an output with a user, an access authority management service 32 that performs user authentication, a virtual network service 33 that builds a virtual network, a virtual computing service 34 that builds a virtual computing system, a virtual disk service 35 that builds a virtual disk, a machine image storage service 36 that stores a disk image of an operating system required to boot a virtual machine, a logging service 37 that monitors the storage systems 10 and 20 to store log information, a serverless computing service 38 that manages serverless computing, and an object store service 39 that provides an object store configured to store object data.

For example, the virtual network service 33, the virtual computing service 34, the virtual disk service 35, the machine image storage service 36, and the serverless computing service 38 are used to build the storage system 20. The object store service 39 is used to store backup data of data stored in the storage system 10.

Figure 3:
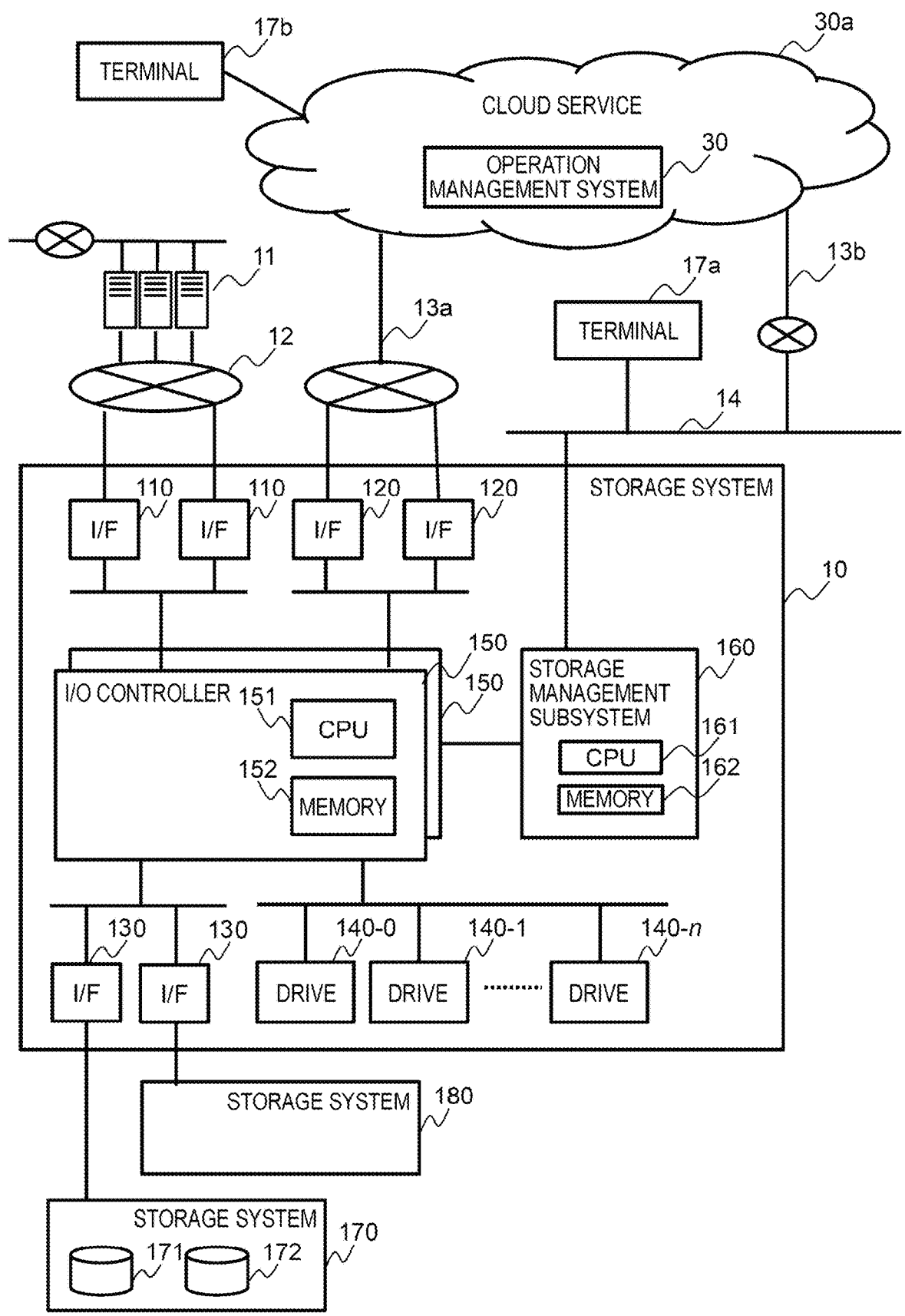
FIG. 3 is a diagram showing a hardware configuration of a storage system (primary site)

FIG. 3 is a diagram showing a hardware configuration of the storage system 10. As shown in FIG. 3, the storage system 10 is connected to a host 11 via a network 12 so as to be able to communicate with each other, and the same is connected to an operation management system 30 via networks 13a and 13b so as to be able to communicate with each other. The host 11 functions as an application server configured to execute applications that perform various data utilization processing using the data stored in the storage system 10. Further, terminals 17a and 17b used by users are connected to the storage system 10 directly or via the cloud service 30a. The terminal 17a is used to manage one storage system 10, and the terminal 17b is used to manage a plurality of storage systems 10 via the cloud service 30a.

The storage system 10 includes an interface (I/F) 110 connected to the host 11, an I/F 120 connected to the cloud service 30a, an I/F 130 connected to external storage systems 170 and 180, a drive 140 configured to store data, an I/O controller 150 configured to read and write data from and to the drive 140, and a storage management subsystem 160 configured to manage the storage system 10. Each component of the storage system 10 may be plural. In the example shown in FIG. 3, the I/Fs 110 to 130 and the I/O controller 150 are multiplexed (duplexed), and there are n drives 140 (drives 140-0 to 140-n). The storage system 170 is a storage system configured to virtualize internal volumes 171 and 172 and use the same as volumes of the storage system 10. The storage system 180 is used as a copy destination storage system configured to remotely copy the data stored in the storage system 10.

The I/O controller 150 is a control unit configured to execute data read processing and data write processing in response to an I/O request from the host 11, and the same includes a CPU 151, which is a processor configured to execute programs and perform various processing, and a memory 152 configured to store programs and various information. The storage management subsystem 160 is a management unit configured to execute management processing of managing the storage system 10, and the same includes a CPU 161, which is a processor configured to execute programs and perform various processing, and a memory 162 configured to store programs and various information.

Figure 4:
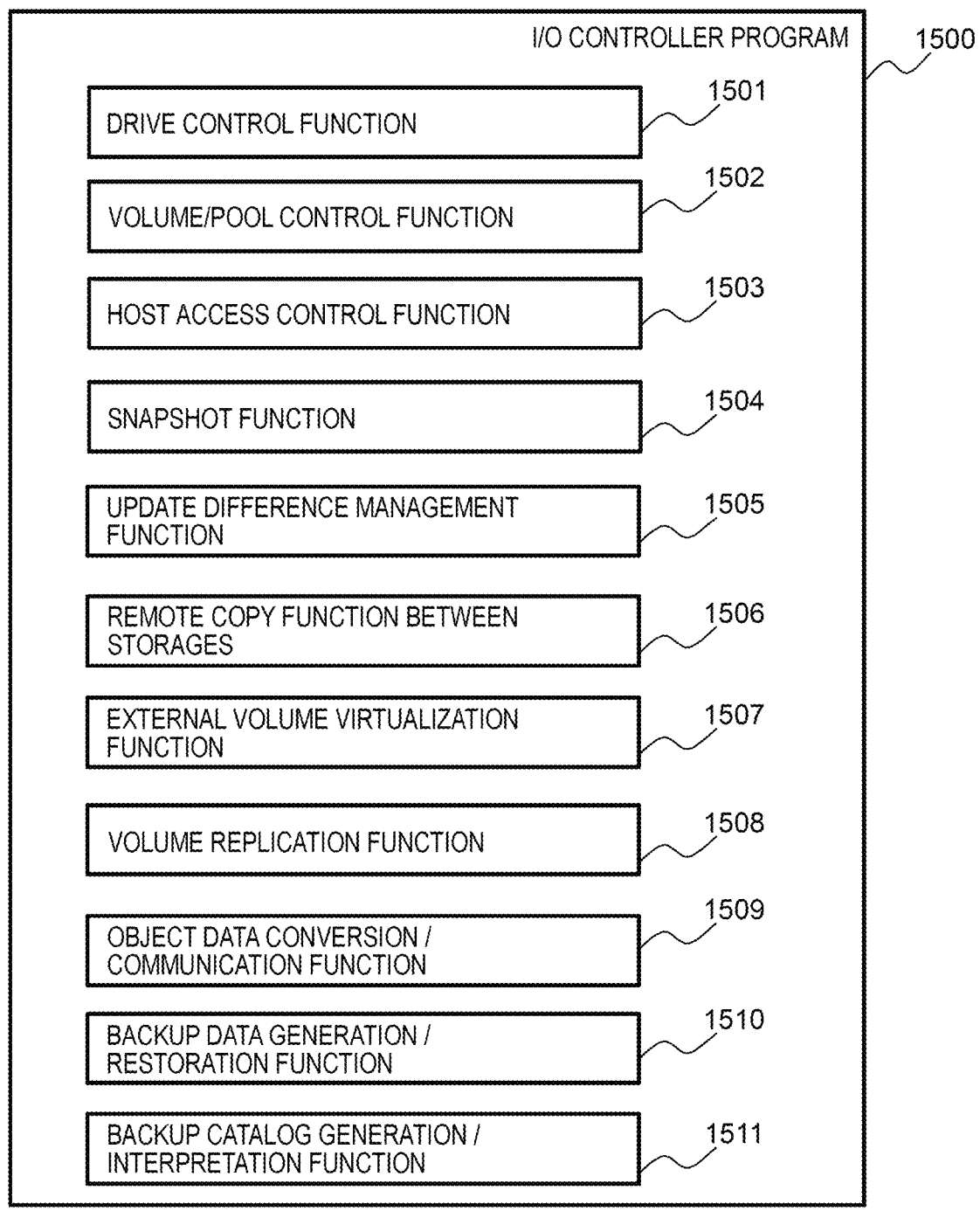
FIG. 4 is a diagram showing an example of functions implemented by an I/O controller program.

FIG. 4 is a diagram showing an example of functions implemented by an I/O controller program 1500, which is a program recorded in the memory 152 of the I/O controller 150. The I/O controller program 1500 shown in FIG. 4 implements a drive control function 1501 of controlling the drive 140, a volume pool control function 1502 of controlling a volume and a storage pool, a host access control function 1503 of being connected to the host 11, a snapshot function 1504 of acquiring a snapshot of the data, an update difference management function 1505 of managing a difference between data after update and data before update, a remote copy function 1506 of performing remote copy between storage systems, an external volume virtualization function 1507 of managing a volume of an external storage system, and a volume replication function 1508 of generating volume replication in the storage system 10. Further, the I/O controller program 1500 implements an object data communication function 1509 of using an object store provided as the cloud service 30*a*, a backup data generation/restoration function 1510 of generating and restoring backup data, and a backup catalog generation/interpretation function 1511 of managing a catalog that manages a generation of backup data.

Figure 5:
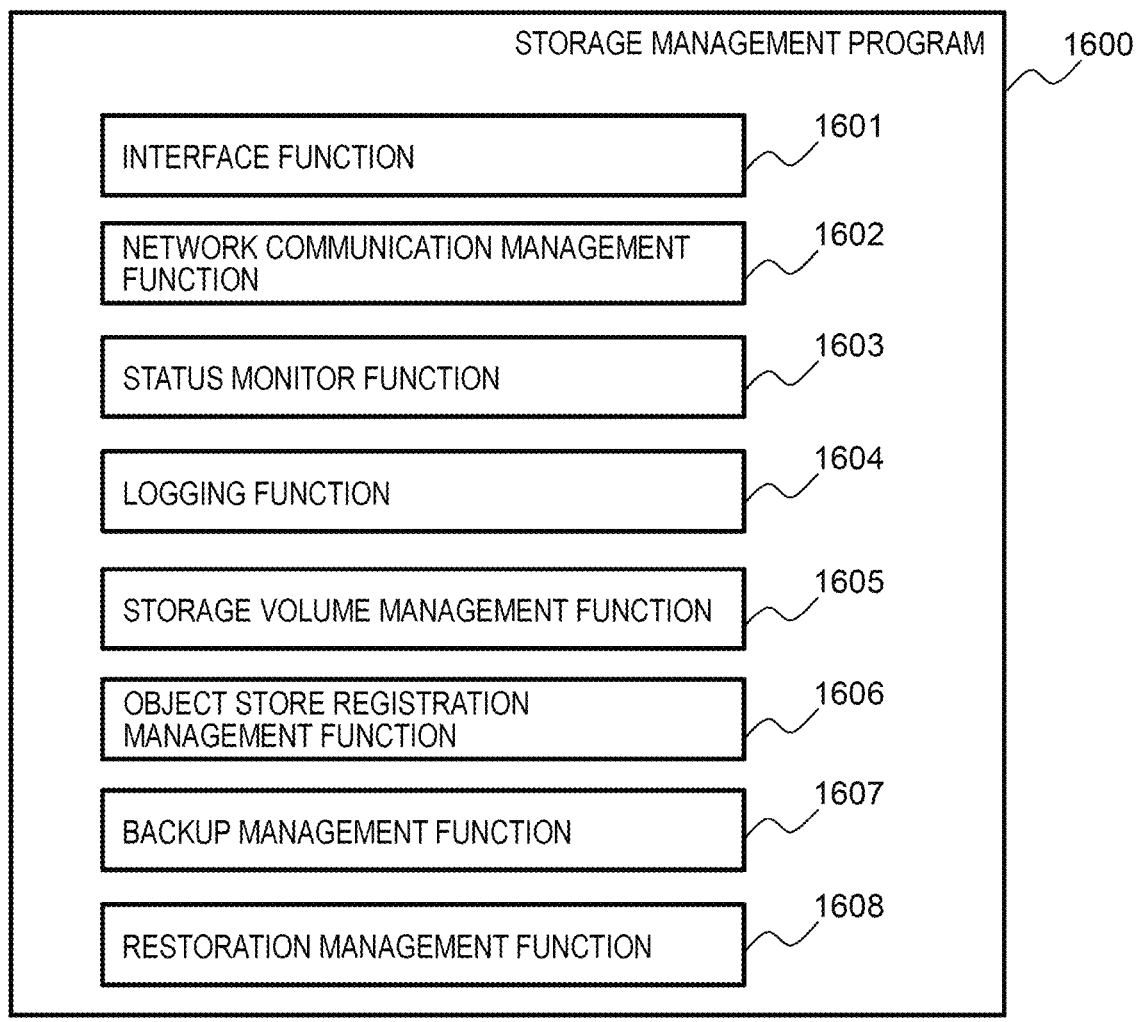
FIG. 5 is a diagram showing an example of functions implemented by a storage management program.

FIG. 5 is a diagram showing an example of functions implemented by a storage management program 1600, which is a program recorded in the memory 162 of the storage management subsystem 160. The storage management program 1600 shown in FIG. 5 stores an interface function 1601 of providing user interfaces such as a graphical user interface (GUI) and a command line interface (CLI), a network communication management function 1602 of controlling communication through a network, a status monitor function 1603 of managing a health condition (status) of the storage system 10, a logging function 1604 of managing logs (error, operation, and the like) of the storage system 10, a storage volume management function 1605 of managing a volume, an object store registration management function 1606 of using an object store, a backup management function 1607 of managing data backup, and a restoration management function 1608 of restoring data.

Figure 6:
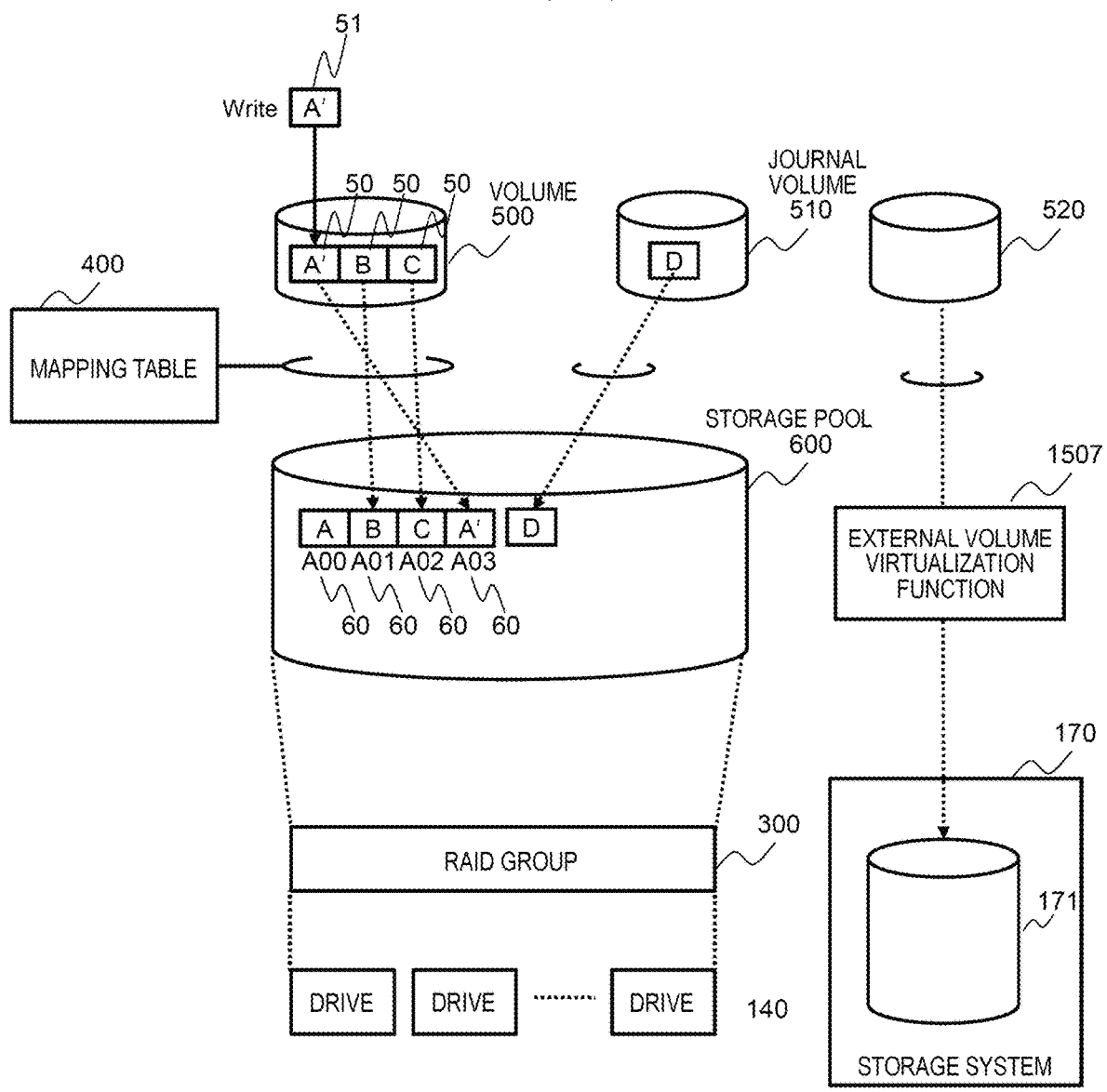
FIG. 6 is a diagram showing volume management in a storage system (secondary site)

FIG. 6 is a diagram showing management of a volume (logical volume) in the storage system 10. In the example of FIG. 6, a plurality of drives 140 of the storage system 10 form a redundant array of independent disk (RAID) group 300 configured to protect data. The RAID is, for example, an RAID 5 or an RAID 6. The capacities of the plurality of drives 140 forming the RAID group 300 are managed as a storage pool 600. In the storage pool 600, capacity is managed for each block 60, which is a predetermined capacity unit.

When data 51 is written to a volume 500, which is a logical storage area provided to the host 11, capacity is allocated from the storage pool 600 to the volume 500 in unit of each block 60, and data is stored in the drive 140 via the allocated volume 500. A correspondence relationship between each address 50 of the volume 500 and each block 60 of the storage pools 600 is managed by information referred to as a mapping table 400. Further, the storage pool 600 is also associated with a journal volume 510 used as a buffer having order guarantee information during remote copy of the storage system 10. Additionally, the external volume virtualization function 1507 associates volume 520 in the storage system 10 with the volume 171 of the external storage system 170.

FIG. 7 is a diagram showing an example of a volume management screen configured to manage a volume. A volume management screen D100 shown in FIG. 7 is an example of a volume management screen configured to manage a first volume, which is a volume of the storage system 10, and for example, the same is generated by the storage management program 1600 and displayed on the terminal 17*a* or 17*b*.

The volume management screen D100 shown in FIG. 7 includes a list display part D101, an add button D102, a delete button D103, a detailed display part D104, and an OK button D105.

The list display part D101 shows a list of volumes provided in the storage system 10. The list display part D101 may indicate the capacity, usage rate (used), status (health), and the like of a volume as description of each volume. The add button D102 is a button configured to add a volume, and the delete button D103 is a button configured to delete a volume. The detailed display part D104 shows detailed information (volume management information) on the volume selected in the list display part D101. In the example of FIG. 7, the detailed display part D104 shows, as detailed information, a volume name, an apparatus product number to identify the storage system 10 having a volume, a volume number to identify the volume in the storage system 10, a volume usage and a provisioning size (capacity provided by provisioning), information indicating a storage pool corresponding to a volume, presence or absence of data backup stored in a volume, a last backup date and time of the last backup, and a unique ID, which is identification information that uniquely identifies a volume in the entire computer system. The unique ID is information obtained by combining the apparatus product number and the volume number in this embodiment. The OK button D105 is a button configured to confirm contents of the volume management screen D100. The volume management information displayed on the volume management screen D100 may be stored in the memory 162 of the storage system 10 and the memory 302 of the operation management system 30 for each volume.

Figure 8:
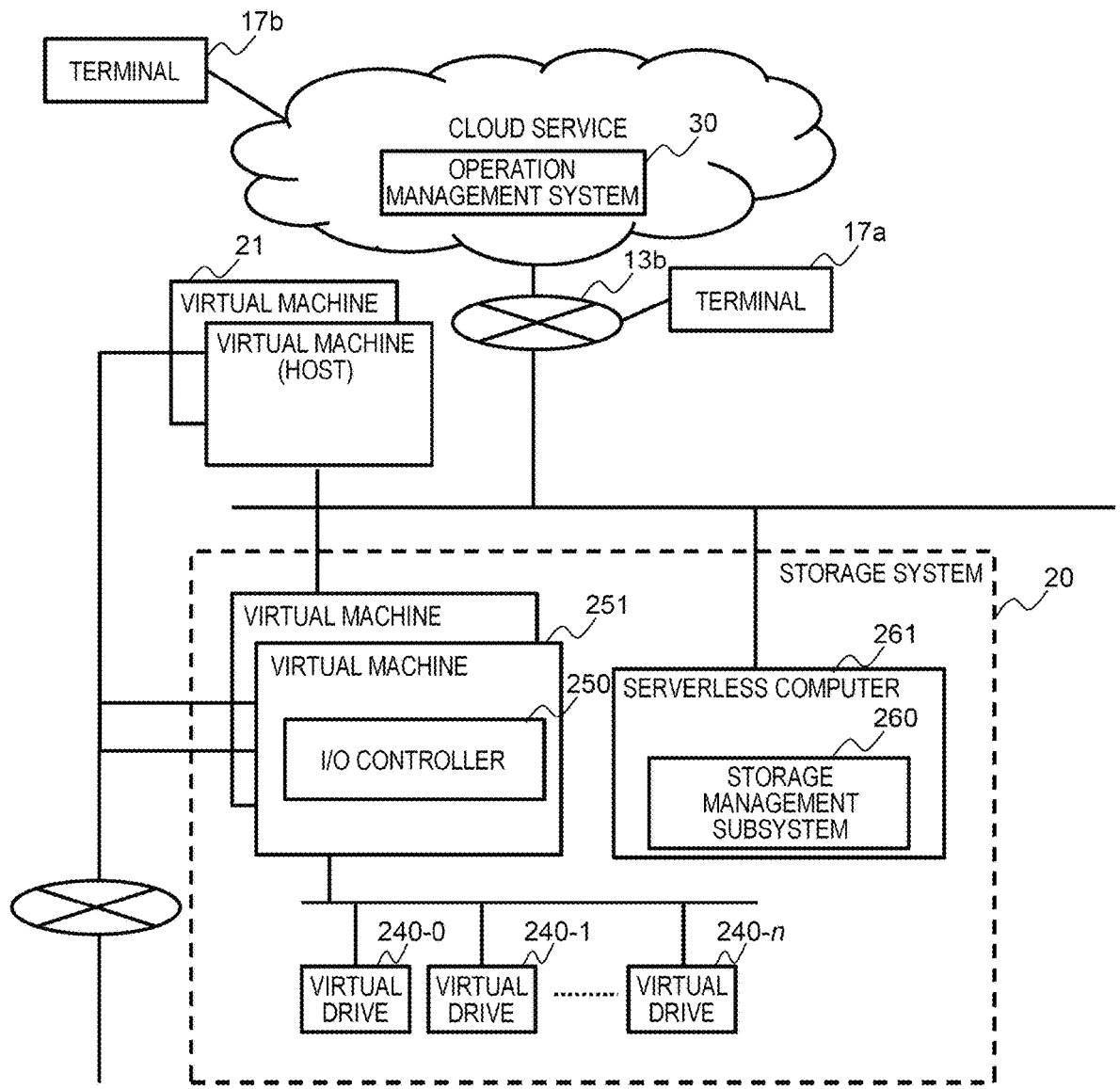
FIG. 8 is a diagram showing a configuration of a storage system.

FIG. 8 is a diagram showing a configuration of the storage system 20. As shown in FIG. 8, the storage system 20 is connected to a virtual machine 21 functioning as a host (application server), and is also connected to the operation management system 30 via the network 13*b* so as to be able to communicate with each other. The terminals 17*a* and 17*b* used by users are connected to the storage system 20 directly or via a cloud service 30*a*.

The storage system 20 includes a virtual drive 240 configured to store data, a virtual machine 251 including an I/O controller 250 configured to read and write data from and to the virtual drive 240, and a serverless computer 261, which is a virtual machine including a storage management subsystem 260 configured to manage the storage system 20. The virtual machine 251 is multiplexed (duplexed), and there are n virtual drives 240 (240-0 to 240-*n*).

The I/O controller 250 and the storage management subsystem 260 have functions equivalent to those of the I/O controller 150 and the storage management subsystem 160 of the storage system 10. For example, the I/O controller 250 has a function similar to that of the I/O controller program 1500 provided in the I/O controller 150, and the storage management subsystem 260 has a function similar to that of the storage management program 1600.

FIG. 9 is a diagram showing an example of an object store registration screen D10 configured to register an object store serving as a backup destination for the data stored in the storage system 10. The object store registration screen D10 shown in FIG. 9 is generated, for example, by the storage management program 1600 and displayed on the terminal 17*a* or 17*b*. The object store registration screen D10 includes a registered store list screen D11 and a new store registration screen D12.

The registered store list screen D11 includes a registered store display field D111 indicating a registered store which is a registered object store, an add button D112 configured to newly register an object store, and a delete button D113 configured to delete a registered object store. When the add button D112 is pressed, the new store registration screen D12 is displayed.

The new store registration screen D12 has input fields D121 to D127, a tag button D128, an OK button D129, and a cancel button D130.

The input fields D121 to 127 are interfaces configured to input information on a new store. The input field D121 is an interface configured to input the cloud service 30a that provides a new store, which is an object store to be registered. The input field D122 is an interface configured to input a name of the cloud service 30a. The input field D123 is an interface configured to input a geographical range (for example, country) in which a new store can be used. The input field D124 is a field configured to input an access ID that allows an access to a new store, and the input field D125 is an interface configured to input a secret key that allows an access to a new store. The input field D126 is an interface configured to input a bucket name indicating a bucket, which is a storage area for backup data in the object store. When no bucket name is input to the input field D126, the cloud service 30a may automatically set the bucket name. The input field D127 is an interface configured to input an encryption method used at the time of accessing a new store.

The tag button D128 is a button configured to add an input field. The OK button D129 is a button configured to confirm registration contents registered in the new store registration screen D12, and when the same is pressed, the screen returns to the registered store list screen D11. The cancel button D130 is a button configured to cancel registration contents registered in the new store registration screen D12, and when the same is pressed, the screen returns to the registered store list screen D11. When the OK button D129 is pressed, the CPU 161 of the storage management subsystem 160 stores, for example, the contents of the new store registration screen D12 in the memory 162 as store management information. The store management information may also be stored in the memory 302 of the operation management system 30.

FIG. 10 is a diagram showing an example of a backup setting screen D30 configured to register backup setting information, which is setting information related to backup of data stored in the storage system 10. The backup setting screen D30 shown in FIG. 10 is generated by the storage management program 1600 and displayed on the terminal 17a or 17b. The backup setting screen D30 has selection parts D301 and D302, designation parts D303 and D304, an OK button D311, and a cancel button D312.

The selection part D301 is an interface configured to select a backup target volume, which is a volume to be backed up. The selection part D302 is an interface configured to select an object store serving as a backup destination of data corresponding to the backup target volume from among registered stores, which are object stores registered on the registered store list screen D11.

The designation part D303 is an interface configured to designate a timing of backup, and the same includes a designation part D3031 configured to designate "one shot" in which backup is performed once at a predetermined timing and a designation part D3032 configured to designate "periodically" in which backup is repeatedly performed at a predetermined period. In the designation part D3031, it is possible to select either performing backup at the present time (immediately) or performing backup at the designated date and time. In the designation part D3032, it is possible to designate a timing of performing backup (here, every day, every week, or every month), a time to start backup, an interval, the maximum number of times, and the like.

The designation part D304 is an interface configured to designate a backup method. Examples of the backup method include a full backup that transmits, to a backup destination, copies of all data each time as backup data, an incremental backup that transmits, to a backup destination, a copy of data that has been changed and added with respect to previous backup data, and a differential backup that transmits, to a backup destination, a copy of data that has been changed and added with respect to initial backup data.

The OK button D311 is a button configured to register backup setting information registered in the backup setting screen D30. The cancel button D312 is a button configured to cancel the backup setting information registered in the backup setting screen D30. When the OK button D311 is pressed, the CPU 161 of the storage management subsystem 160 stores, for example, contents of the backup setting screen D30 in the memory 162 as backup management information. Further, the backup management information may be stored in the memory 302 of the operation management system 30.

Figure 11:
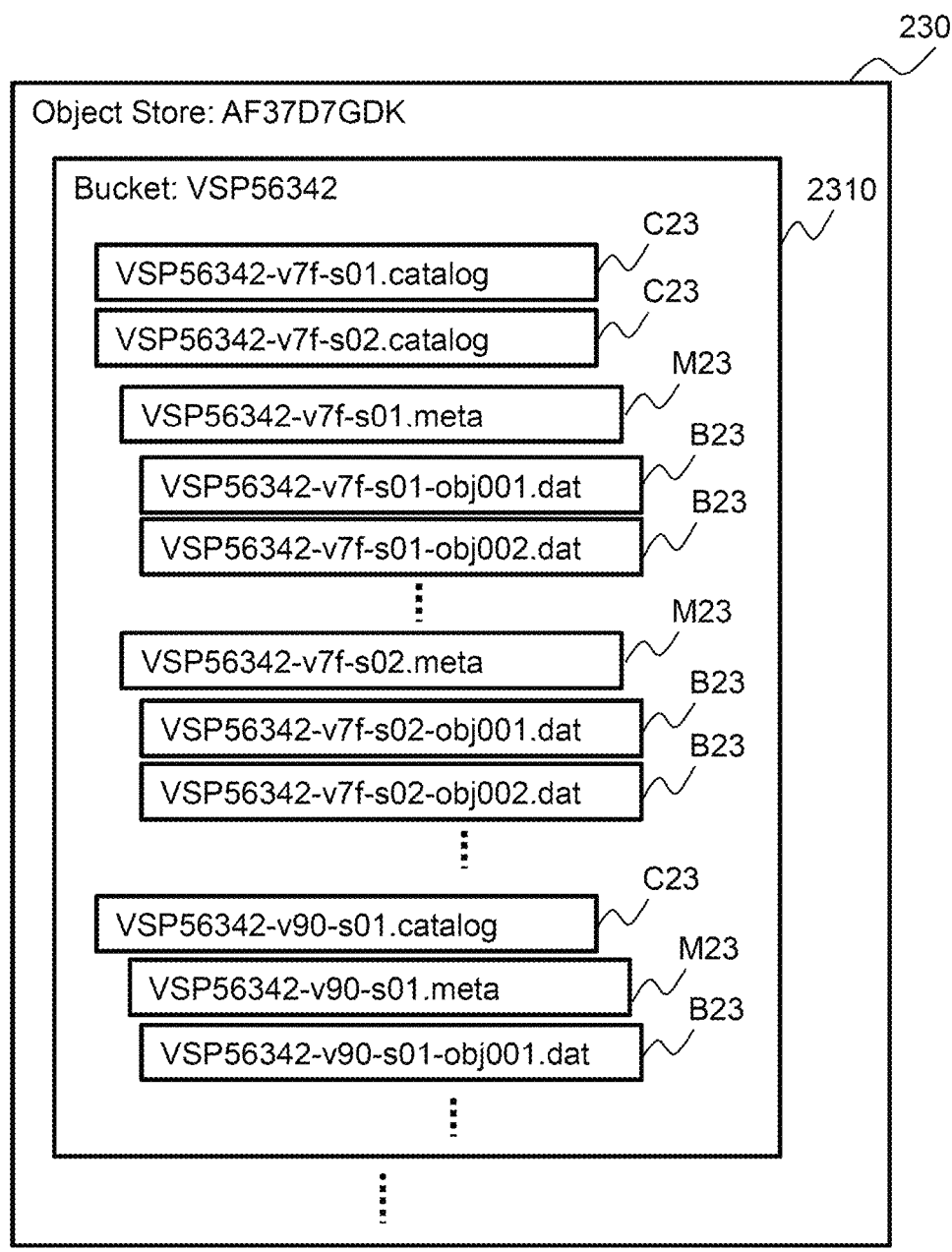
FIG. 11 is a diagram showing an example of data stored in an object store.

FIG. 11 is a diagram showing an example of data stored in an object store 230 provided by the object store service 39.

As shown in FIG. 11, the object store 230 provided by the object store service 39 is an object store of a backup destination and has a bucket 2310. The bucket 2310 stores backup data B23, metadata M23, and catalog data C23. The backup data B23, the metadata M23, and the catalog data C23 are respectively stored as object data, and each object data is identified by identification information referred to as an object key (OBJ Key).

Figure 12:
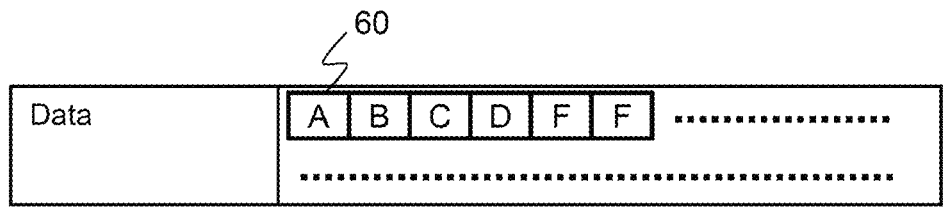
FIG. 12 is a diagram showing an example of backup data.

FIG. 12 is a diagram showing an example of the backup data B23. As shown in FIG. 12, the backup data B23 is stored in advance in unit of the block 60. When the amount of data is large (the number of blocks is large), the data may be divided into a plurality of objects for each predetermined number of blocks or data.

FIG. 13 is a diagram showing an example of the metadata M23. The metadata M23 is data indicating a relationship between the backup data B23 and the volume, and includes fields M231 to M234 in the example of FIG. 13.

The field M231 stores the size (number of blocks) of a bitmap indicating whether data corresponding to a block is backed up for each block of the backup data B23 (that is, volume address). The field M232 stores a bitmap. In the example of FIG. 13, the bitmap indicates "1" when data is backed up and "0" when data is not backed up. The field M233 stores an object key configured to identify the backup data B23 managed by the metadata M23. The field M234 stores a data length of each block of the backup data B23. In the example of FIG. 13, all the data lengths are the same, but when data is compressed, the data lengths of respective blocks may be different. When the backup data B23 is divided into a plurality of objects, the metadata M23 is provided with a plurality of fields 233 and 234 respectively corresponding to objects of backup data.

FIG. 14 is a diagram showing an example of the catalog data C23. The catalog data C23 is information for managing a backup generation, which is a generation of backup data. In the example of FIG. 14, as the catalog data C23, catalog data C23a that manages backup data of a second generation and catalog data C23b that manages backup data of a first generation are shown.

The catalog data C23a and C23b include fields 231 to 237. The field 231 stores an apparatus product number, which is identification information that identifies the storage system 10 configured to store a backup target volume. The field 232 stores a backup volume number, which is a volume number of a backup target volume. The field 233 stores a usage amount and a provisioning size of a backup target volume. The field 234 stores a backup generation number indicating a generation of backup data managed by the catalog data. The field 235 stores a backup acquisition date and time, which is a date and time when backup data managed by the catalog data is acquired. The field 236 stores an object key that identifies metadata corresponding to backup data managed by the catalog data. The field 237 stores an object key that identifies parent catalog data, which is catalog data that manages a backup generation that is one previous to the catalog data. However, since the catalog data C23a manages the backup data of the first generation, there is no parent catalog data. Therefore, null data is stored in the field 237 of the catalog data C23a. It is noted that when the full backup is selected as a backup method, null data is stored in the field 237 for catalog data of all generations. The field 238 stores a unique ID of a backup target volume.

The catalog data C23 is registered each time data is backed up for each backup target volume. The metadata M23 and the backup data B23 are generated corresponding to each catalog data C23.

FIG. 15 is a flowchart showing an example of failover processing from the storage system 10 to the storage system 20. Failover processing is processing executed when the storage system 10 does not operate normally due to a disaster or the like, and the same is processing of transferring execution of data utilization processing by the storage system 10 to the storage system 20.

First, when execution of the failover processing is instructed, the operation management system 30 (specifically, CPU 301) starts a virtual machine group (virtual machine 251, serverless computer 261, and the like) forming the storage system 20 to build the storage system 20 (step S101). The operation management system 30 adds the virtual drives 240 to the storage system 20 and generates storage pools corresponding to those virtual drives 240 (step S102).

The operation management system 30 receives a registration instruction to register an object store that stores backup data of restoration target data, which is data to be restored, and registers the object store according to the registration instruction (step S103). For example, the operation management system 30 displays a screen similar to the object store registration screen D10 shown in FIG. 9, and receives a registration instruction from a user via the screen.

The operation management system 30 receives restoration selection information on selected restoration target data (step S104). The operation management system 30 executes restoration processing (refer to FIG. 17) of restoring the selected data from the restoration selection information based on the backup data stored in the registered object store (step S105).

The operation management system 30 starts a virtual machine group (virtual machine 21 or the like) functioning as a host for the storage system 20 (step S106). The operation management system 30 connects the virtual machine group functioning as a host to the storage system 20 (step S107).

The operation management system 30 executes consistency securing processing (refer to FIG. 20) of securing consistency of the data stored in the storage systems 10 and 20 (step S108), and ends the processing.

FIG. 16 is a diagram showing an example of a restoration data selection screen for a user to select data to be restored in step S104 of FIG. 15. The restoration data selection screen D40 shown in FIG. 16 has selection fields D401 to D404, a restore button D411, and a cancel button D412.

The selection field D401 is an interface configured to select an object store that stores backup data of data to be restored from the object store registered in step S103 of FIG. 15. The selection field D402 is an interface configured to select a volume of a restoration source storing the data to be restored. The selection field D403 is an interface configured to select a version (date and time) in which the backup data is backed up. The selection field D404 is an interface configured to select a volume of a restoration destination that restores the data to be restored. In the example of FIG. 16, the selection field D404 includes a selection field D4041 configured to select an original volume that already exists at the restoration destination and a selection field D4042 configured to select a new volume to be generated at the restoration destination. In the selection field D4042, a storage pool that generates a new volume can be selected.

The restore button D411 is a button configured to confirm a selected content of the restoration data selection screen D40 and to input a registration instruction indicating the selected content. The cancel button D412 is a button configured to cancel the selected content of the restoration data selection screen D40.

Figure 17:
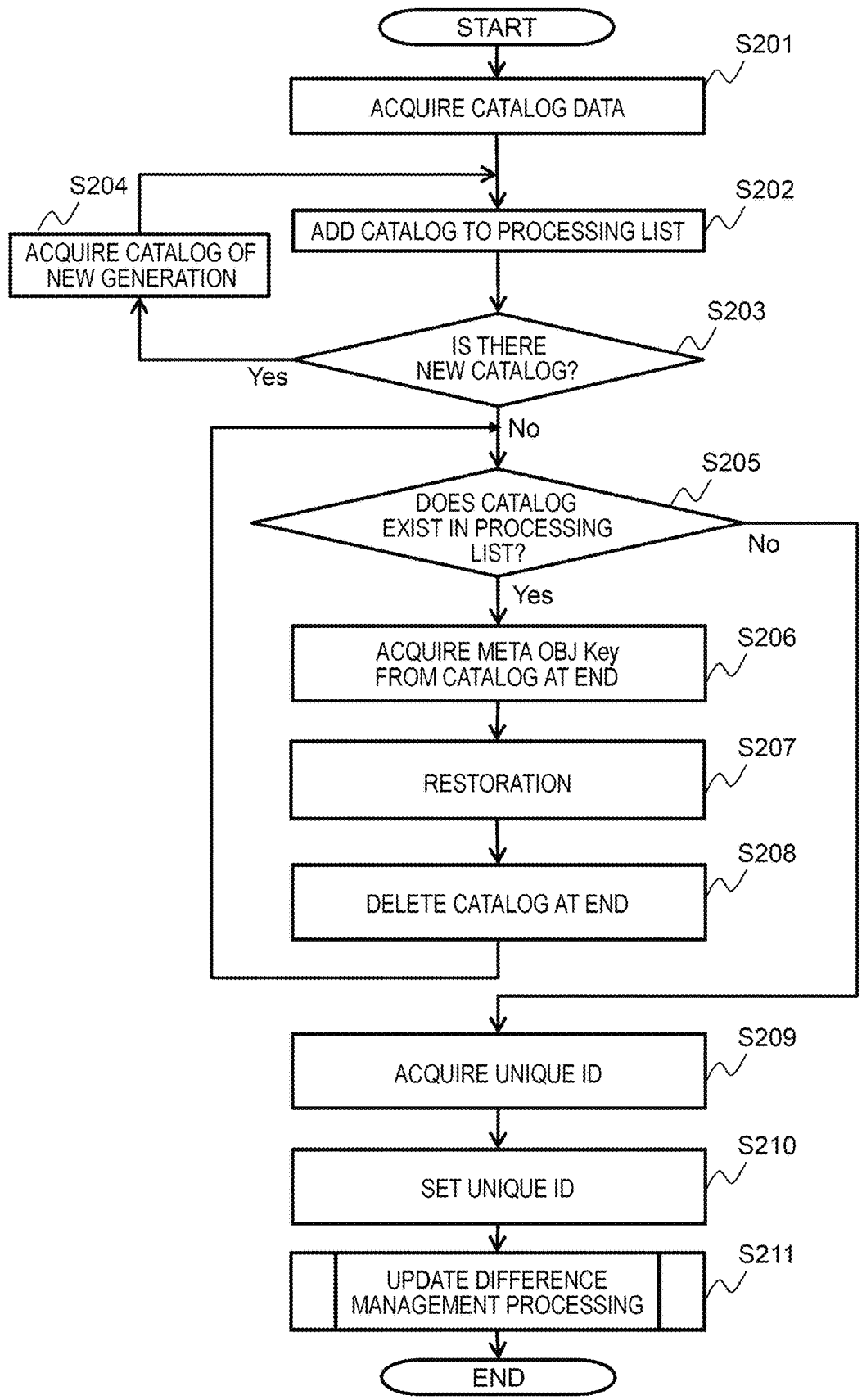
FIG. 17 is a flowchart showing an example of restoration processing.

FIG. 17 is a flowchart showing an example of restoration processing in step S105 of FIG. 15.

In the restoration processing, the operation management system 30 acquires catalog data of backup data of data to be restored as target catalog data (step S201). The operation management system 30 adds the acquired target catalog data to the end of a processing list prepared in advance (step S202). The operation management system 30 confirms the target catalog data and confirms whether parent catalog data exists in the target catalog data (step S203).

When the parent catalog data exists (step S203: Yes), the operation management system 30 newly acquires the parent catalog data as target catalog data (step S204), and returns to the processing in step S202. On the other hand, when the parent catalog data does not exist (step S203: No), the operation management system 30 confirms whether catalog data exists in the processing list (step S205).

When the catalog data exists in the processing list (step S205: Yes), the operation management system 30 acquires a meta object key, which is an object key of metadata, from the catalog data at the end of the processing list (step S206). The operation management system 30 restores, based on metadata identified by the meta object key, backup data corresponding to the metadata to a volume of a restoration destination indicated by a registration instruction in the storage system 20 (step S207). The operation management system 30 then deletes the catalog data at the end of the processing list (step S208), and returns to the processing in step S205.

On the other hand, when the catalog data does not exist in the processing list (step S205: No), the operation management system 30 acquires a volume name and a unique ID of a volume of a restoration source (step S209). For example, the operation management system 30 acquires the volume name and the unique ID of the restoration source from the catalog data deleted last from the processing list.

The operation management system 30 sets the acquired volume name and unique ID of the restoration source to the volume of the restoration destination of the storage system 20 (step S210). For example, the operation management system 30 sets the volume name and the unique ID of the restoration source to volume management information for the volume of the restoration destination.

Then, the operation management system 30 starts update difference management processing (refer to FIG. 19) of managing data stored in the volume of the restoration destination (step S211), and ends the processing.

FIG. 18 is a diagram showing an example of a volume management screen configured to manage a volume after restoration processing. A volume management screen D100a is an example of a volume management screen configured to manage a second volume, which is a volume of the storage system 20, and for example, the same is generated by the storage management program 1600 and displayed on the terminal 17a or 17b.

The volume management screen D100a shown in FIG. 18 is a screen configured to manage a volume of the storage system 20 after restoration processing. In the same manner as that of the volume management screen D100 shown in FIG. 7, the volume management screen D100a includes a list display part D101, an add button D102, a delete button D103, a detailed display part D104, and an OK button D105. It is shown that the unique ID of the detailed display part D104 of the volume management screen D100a has the same value as the unique ID of the detailed display part D104 of the volume management screen D100 shown in FIG. 7, and the unique ID is handed over from the storage system 10 to the storage system 20. The volume management information displayed on the volume management screen D100a may be stored in the storage system 20 and the memory 302 of the operation management system 30 for each volume.

Figure 19:
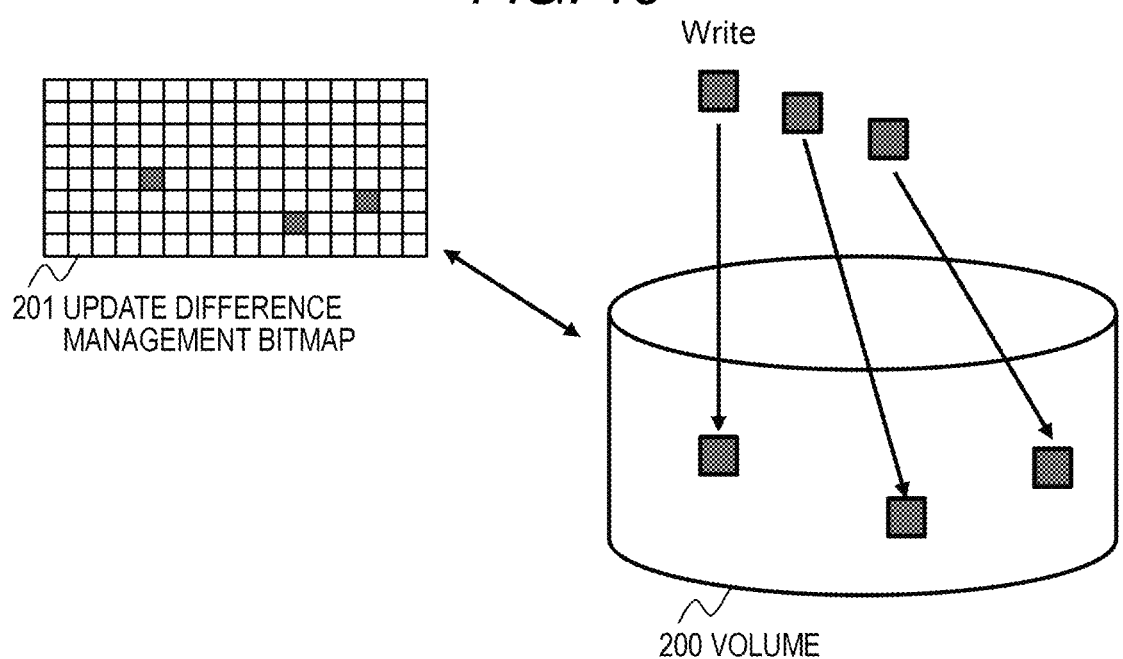
FIG. 19 is a diagram showing an example of update difference management processing.

FIG. 19 is a diagram showing an example of the update difference management processing in step S211 of FIG. 17. As shown in FIG. 19, the operation management system 30 includes an update difference management bitmap 201 corresponding to the volume 200 of the storage system 20. The update difference management bitmap 201 is update information indicating updated contents after failover processing of data stored in the volume of the storage system 20, and the same has a plurality of bits respectively corresponding to addresses of the volume.

In the update difference management processing, the operation management system 30 changes a bit value of the update difference management bitmap 201 corresponding to the updated (written) address in the volume 200 of the storage system 20 from 0 to 1. As a result, the operation management system 30 uses the update difference management bitmap 201 to grasp correspondence between the state when the data to be restored is restored and the state after the same is updated in the storage system 20, thereby making it possible to identify update data updated in the storage system 20 among the data stored in the volume 200.

Figure 20:
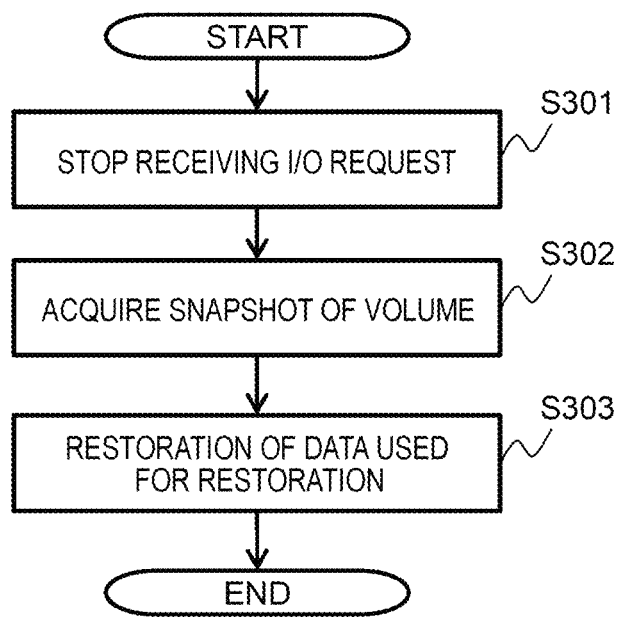
FIG. 20 is a diagram showing an example of consistency securing processing.

FIG. 20 is a diagram showing an example of the consistency securing processing in step S108 of FIG. 15.

In the consistency securing processing, the operation management system 30 stops receiving an I/O request from the host 11 with respect to the storage system 10 (step S301). The operation management system 30 acquires and saves a snapshot of a volume storing data to be restored in the storage system 10 (step S302). The operation management system 30 updates data of the volume to the state of the restored data (backup data used for restoration) (step S303), and ends the processing.

Depending on the state of the storage system 10, the data stored in the storage system 10 may deviate from the state at the start of failover processing during execution of the failover processing. At the time of executing failback processing to be described late, when the data stored in the storage system 10 deviates from the state at the start of the failover processing, the data may not be restored accurately. Therefore, the operation management system 30 can suppress the deviation by performing the consistency securing processing.

Figure 21:
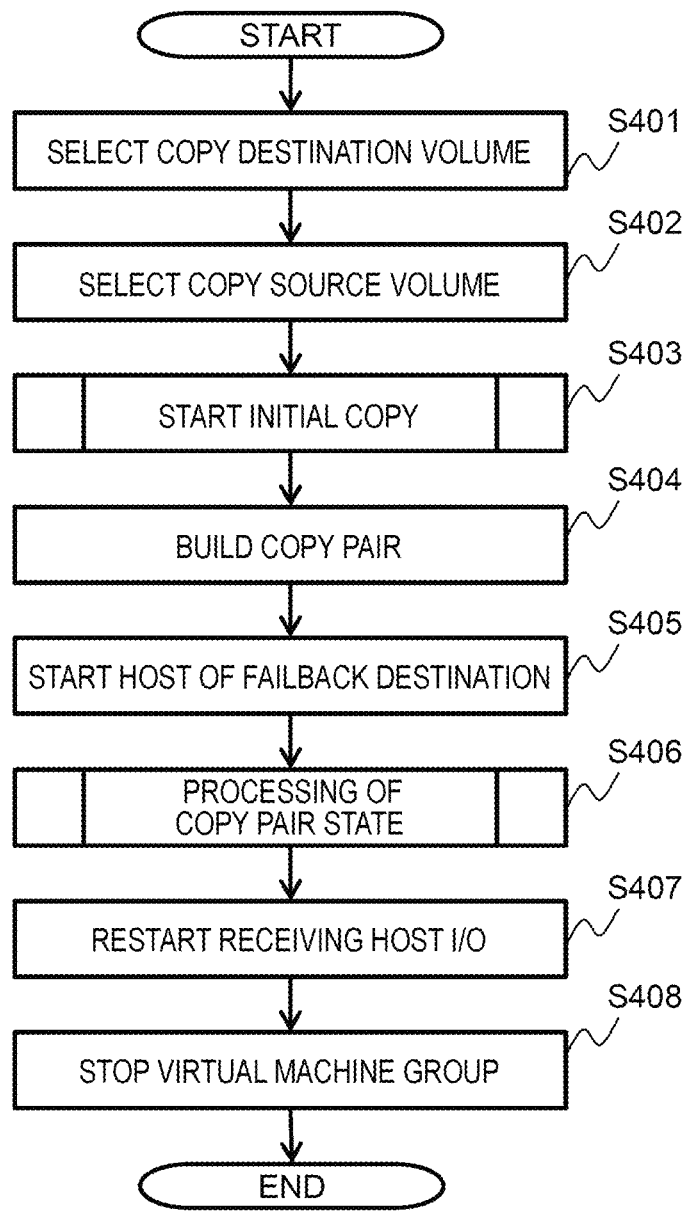
FIG. 21 is a flowchart showing an example of failback processing.

FIG. 21 is a flowchart showing an example of failback processing from the storage system 20 to the storage system 10. Failback processing is processing executed when the storage system 10 is restored, and the same is processing of returning execution of data utilization processing by the storage system 20 to the storage system 10.

In the failback processing, the operation management system 30 first receives, from a user, copy destination selection information that selects a volume of the storage system 10, which is a failback destination, as a copy destination volume (step S401). The operation management system 30 then receives, from the user, copy source selection information that selects a volume of the storage system 20, which is a failback source, as a copy source volume (step S402).

The operation management system 30 executes initial copy processing (refer to FIG. 22) of remotely copying data in the copy source volume stored in the storage system 20 to the storage system 10 as data of the copy destination volume (step S403).

The operation management system 30 builds a copy pair using the copy source volume and the copy destination volume (step S404). The operation management system 30 starts the host 11 of the storage system 10, which is a failback destination, (step S405) and executes processing of a copy pair state (refer to FIG. 23) (step S406).

When the processing of the copy pair state is completed, the operation management system 30 causes the storage system 10 to start receiving the I/O request (step S407). The operation management system 30 then stops the virtual machine group forming the storage system 20, which is a failback source, (step S408), and ends the processing.

In addition, in S402, the operation management system 30 may select, based on the volume management information, a volume having the same unique ID as that of the copy destination volume among the volumes of the storage system 20, which is the failback source, as the copy source volume.

Figure 22:
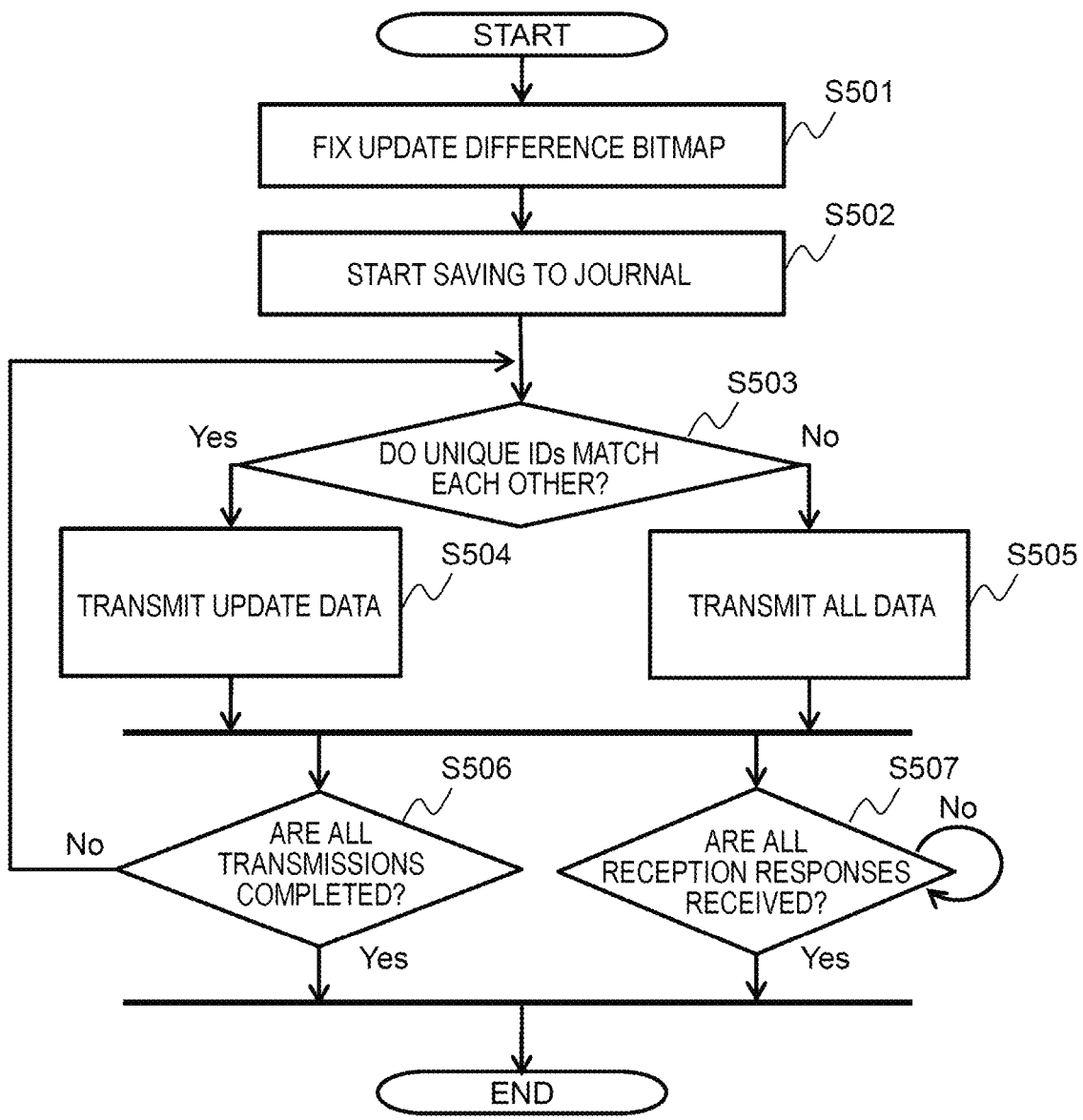
FIG. 22 is a flowchart showing an example of initial copy processing.

FIG. 22 is a flowchart showing an example of the initial copy processing in step S403 of FIG. 21.

In the initial copy processing, the operation management system 30 fixes an update difference management bitmap corresponding to the copy source volume of the storage system 20 (step S501). The update difference management bitmap is fixed, for example, by replacing the update difference management bitmap to be updated with another bitmap.

The operation management system 30 causes the storage system 20 to start journal storage processing of storing write data for the copy source volume in a journal volume as a journal (step S502).

The operation management system 30 compares, based on the volume management information stored in the memory 302, the unique ID of the copy destination volume and the unique ID of the copy source volume, and determines whether these unique IDs match each other (step S503).

When the unique IDs match each other (step S503: Yes), the operation management system 30 sequentially transmits, based on the fixed update difference management bitmap, update data (data corresponding to a block, the bit of which is "1" in the update difference management bitmap) updated after the failover processing among the data stored in the copy source volume to the storage system 20 as write data of the copy destination volume (step S504).

When the unique IDs do not match each other (step S503: No), the operation management system 30 sequentially transmits all pieces of data stored in the copy source volume to the storage system 20 as the write data of the copy destination volume (step S505).

The operation management system 30 confirms whether all pieces of the write data are transmitted (step S506), and also confirms whether all responses (reception responses) to the write data are received (step S507).

When all pieces of the write data are transmitted and all responses are received (steps S504 and S505: Yes), the operation management system 30 ends the processing.

Figure 23:
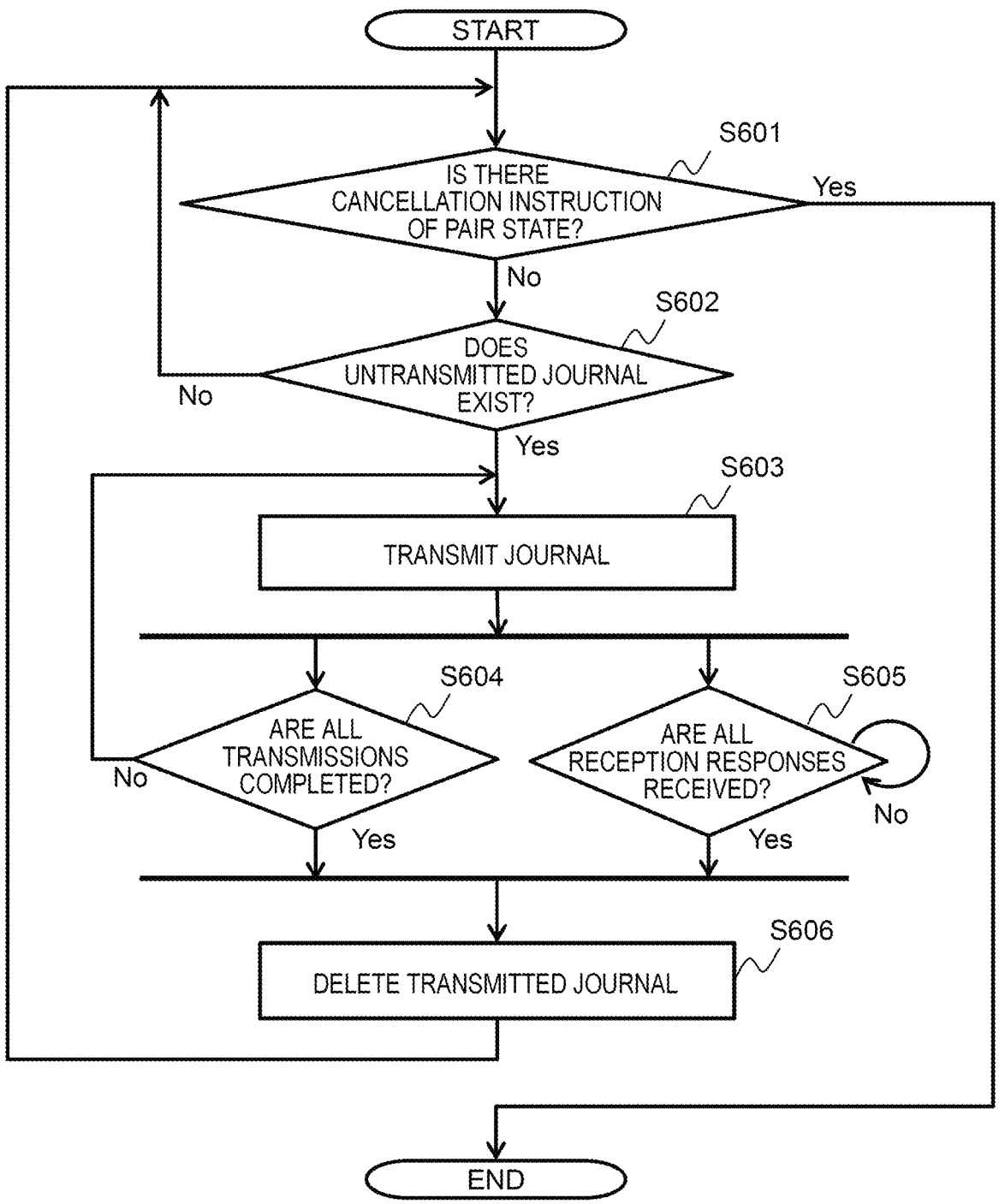
FIG. 23 is a flowchart showing an example of processing of a copy pair state.

FIG. 23 is a flowchart showing an example of the processing of the copy pair state in step S406 of FIG. 21.

In the processing of the copy pair state, first, the operation management system 30 determines whether a cancellation instruction with respect to the copy pair state is received (step S601). When the cancellation instruction is received (step S601: Yes), the operation management system 30 ends the processing.

When the cancellation instruction is not received (step S601: No), the operation management system 30 determines whether an untransmitted journal exists in the journal volume (step S602). When the untransmitted journal does not exist therein (step S602: No), the operation management system 30 returns to the processing in step S601.

When the untransmitted journal exits (step S602: Yes), the operation management system 30 sequentially transmits the journals stored in the journal volume to the storage system 20 as the write data of the copy destination volume (step S603).

The operation management system 30 confirms whether all journals are transmitted (step S604), and confirms whether responses (reception responses) to all journals are received (step S605).

When all journals are transmitted and all responses are received (steps S604 and S605: Yes), the operation management system 30 deletes the transmitted journals (step S606) and returns to the processing in step S601.

In the embodiment described above, the operation management system 30 executes the failover processing and the failback processing, and some or all of the processing may be performed by the controllers of the storage systems 10 and 20 (I/O controllers 150 and 250, storage management subsystems 160 and 260). In this case, the operation management system 30 and the controller form a management apparatus that manages the storage systems 10 and 20.

As described above, according to this embodiment, the memory 302 of the operation management system 30 stores, for each volume, a unique ID that uniquely identifies the first volume provided in the storage system 10 through the entire computer system. In the failover processing from the storage system 10 to the storage system 20, the CPU 301 restores the data stored in the first volume to the second volume provided in the storage system 20, and the same stores, in the memory 302, the unique ID of the first volume in association with the second volume. After the failover processing is completed, the CPU 301 manages the update difference management bitmap 201 indicating updated contents for the data stored in the second volume. In the failback processing from the storage system 20 to the storage system 10, the CPU 301 transmits, based on the update difference management bitmap 201, the update data updated after the failover processing among the data stored in the second volume to the first volume identified by the unique ID associated with the second volume. Therefore, in the failback processing, only the data updated after the failover processing can be transmitted to the storage system 10, thereby making it possible to shorten the time required for the failback processing.

Further, in this embodiment, the CPU 301 stops receiving the I/O request to the first volume and restores the data stored in the first volume to the state of backup data. Therefore, it is possible to secure consistency of the data stored in the storage systems 10 and 20 more reliably.

In addition, in this embodiment, when the unique IDs of the first volume and the second volume to be subjected to the failback processing match each other, the CPU 301 transmits the update data to the first volume, and when the unique IDs do not match each other, the same transmits all pieces of data to the first volume. Therefore, the failback processing can be performed more accurately.

Additionally, in this embodiment, the CPU 301 remotely copies the update data to the first volume in the failback processing. Therefore, the failback processing can be easily performed.

Second Embodiment

In a second embodiment, processing different from the first embodiment will be mainly described.

Figure 24:
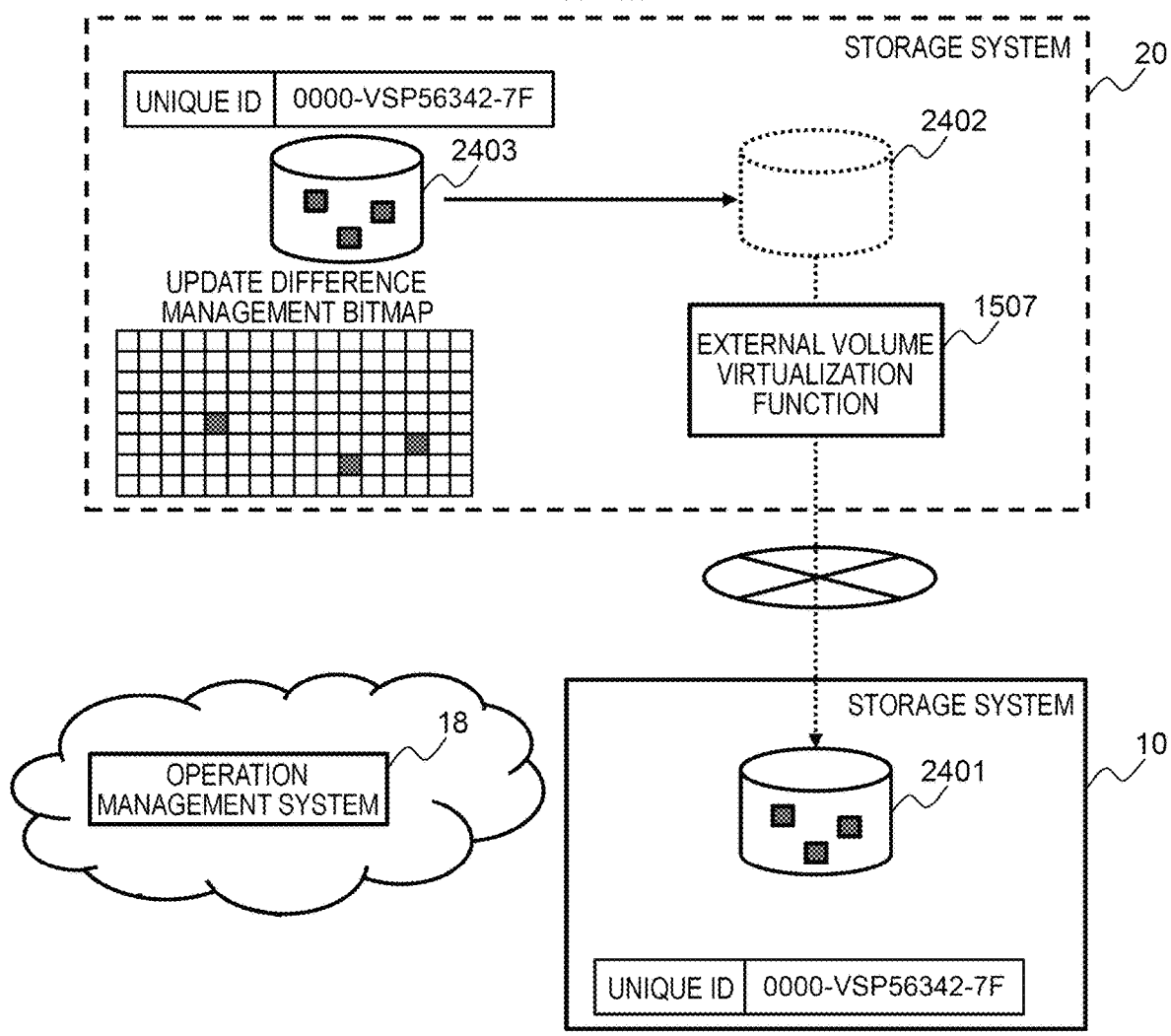
FIG. 24 is a diagram showing another example of the failback processing.

FIG. 24 is a diagram showing an example of failback processing performed by a computer system according to the second embodiment of the present disclosure.

As shown in FIG. 24, in the failback processing, the operation management system 30 causes the storage system 20 to generate a virtual volume 2402 obtained by mapping a copy destination volume 2401 selected from the volumes of the storage system 10 using an external volume virtualization function 1507. Then, the operation management system 30 locally copies data stored in a copy source volume 2403 selected from the volumes of the storage system 20 to the virtual volume 2402 (shadowimage).

Figure 25:
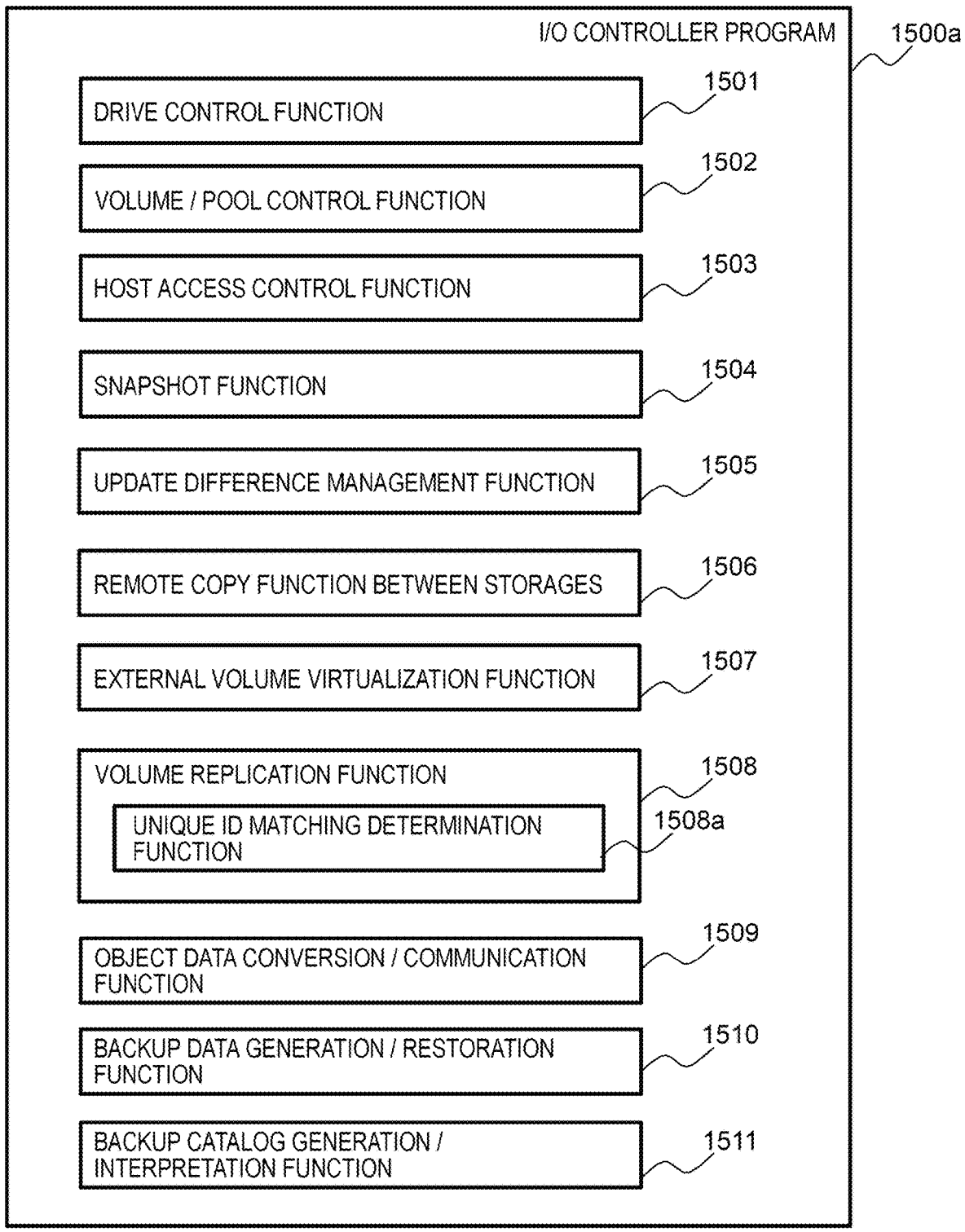
FIG. 25 is a diagram showing another example of the functions implemented by the I/O controller program.

FIG. 25 is a diagram showing an example of functions implemented by an I/O controller program 1500a in this embodiment. The I/O controller program 1500a shown in FIG. 25 is different from the I/O controller program 1500 of the first embodiment shown in FIG. 4 in that the volume replication function 1508 has a unique ID determination function 1508a of comparing unique IDs of volumes.

Figure 26:
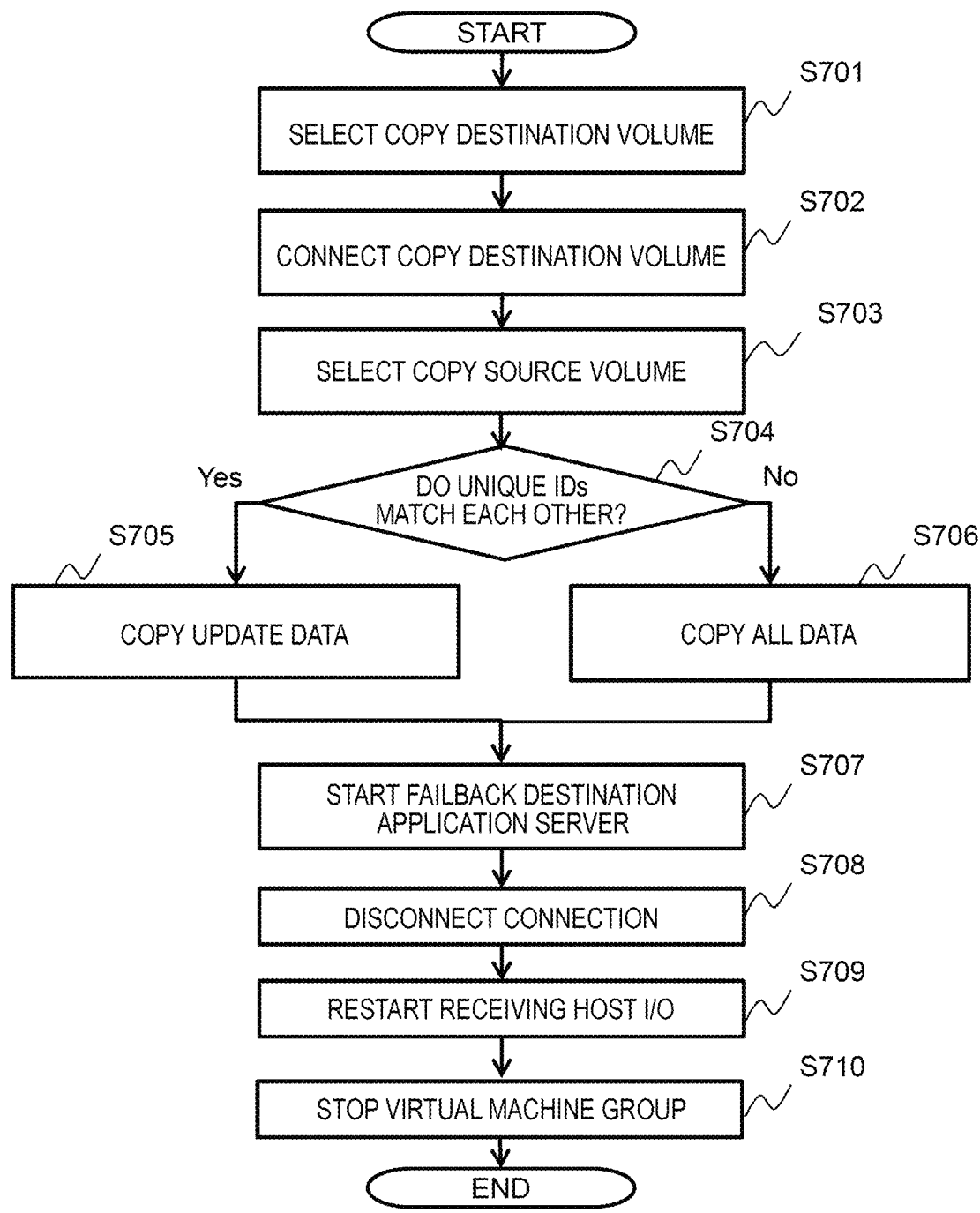
FIG. 26 is a diagram showing another example of the failback processing.

FIG. 26 is a flowchart showing an example of failback processing in this embodiment.

In the failback processing, the operation management system 30 first receives, from a user, copy destination selection information that selects a volume of the storage system 10, which is a failback destination, as a copy destination volume (step S701). The operation management system 30 uses the external volume virtualization function 1507 of the storage system 20 to generate a virtual volume obtained by mapping the copy destination volume of the storage system 10 in the storage system 20 (step S702).

The operation management system 30 receives, from the user, copy source selection information that selects a volume of the storage system 20, which is a failback source, as a copy source volume (step S703).

The operation management system 30 instructs the storage system 20 to determine whether the unique ID of the copy destination volume and the unique ID of the copy source volume match each other (step S704).

When the unique IDs match each other (step S704: Yes), the storage system 20 locally copies, based on an update difference management bitmap, update data updated after the failover processing among the data stored in the copy source volume to the virtual volume, thereby transmitting the update data to the copy destination volume of the storage system 10 (step S705). On the other hand, when the unique IDs do not match each other (step S704: No), the storage system 20 locally copies all pieces of data corresponding to the copy source volume to the virtualized external volume (step S706).

After that, the operation management system 30 starts the host 11 of the storage system 10 serving as the failback destination (step S707). When the data copy is completed, the operation management system 30 disconnects connection between the copy destination volume and the storage system 20 (step S708). The operation management system 30 causes the storage system 10 to start receiving an I/O request from the host 11 (step S709). The operation management system 30 then stops a virtual machine group forming the storage system 20 serving as the failback source (step S710), and ends the processing.

Figure 27:
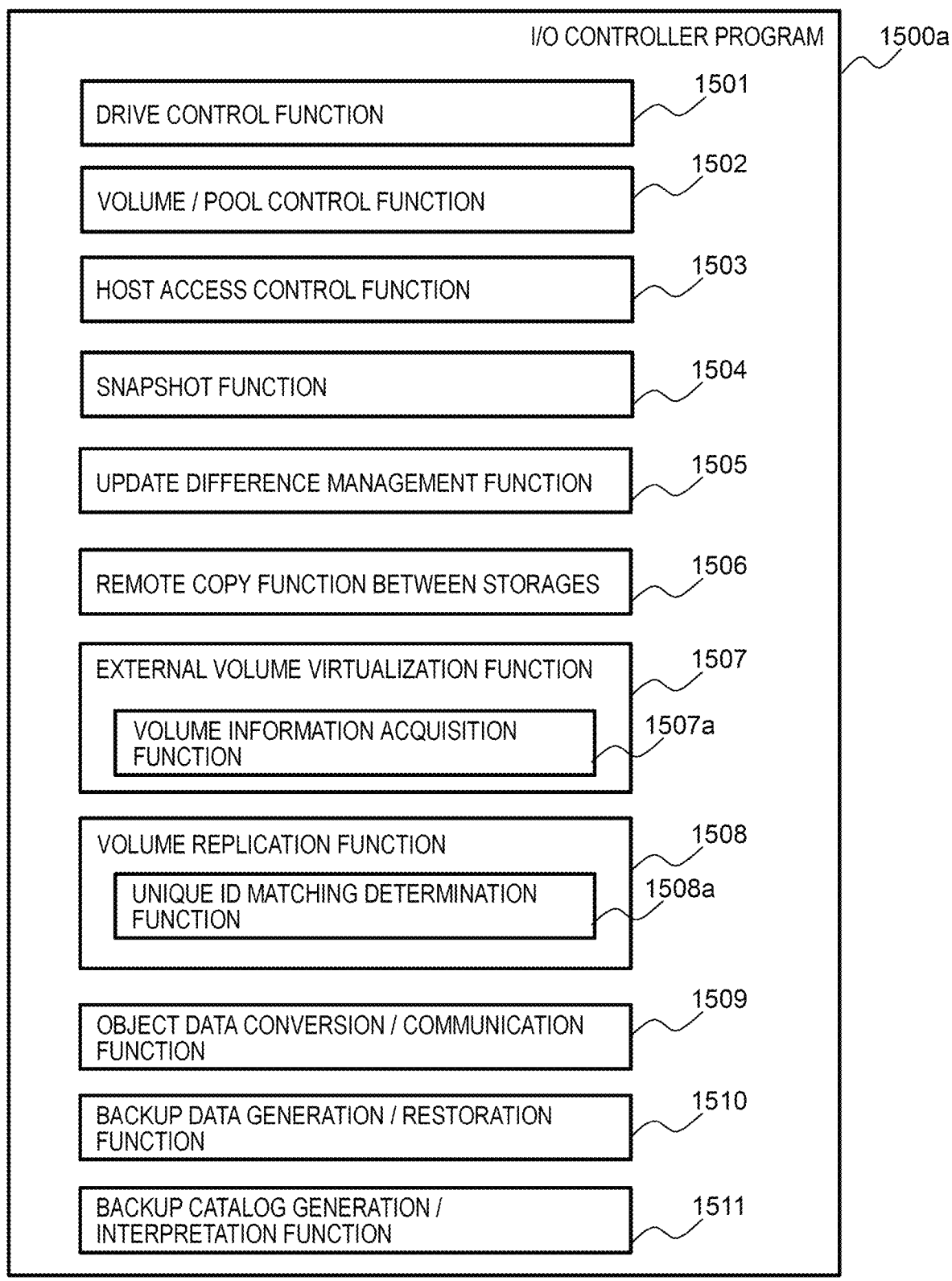
FIG. 27 is a diagram showing another example of the functions implemented by the I/O controller program.

FIG. 27 is a diagram showing an example of functions implemented by an I/O controller program 1500b in a modification of the second embodiment of the present disclosure. The I/O controller program 1500b shown in FIG. 27 is different from the I/O controller program 1500a shown in FIG. 25 in that the external volume virtualization function 1507 has a volume information acquisition function 1507a of acquiring volume information.

Figure 28:
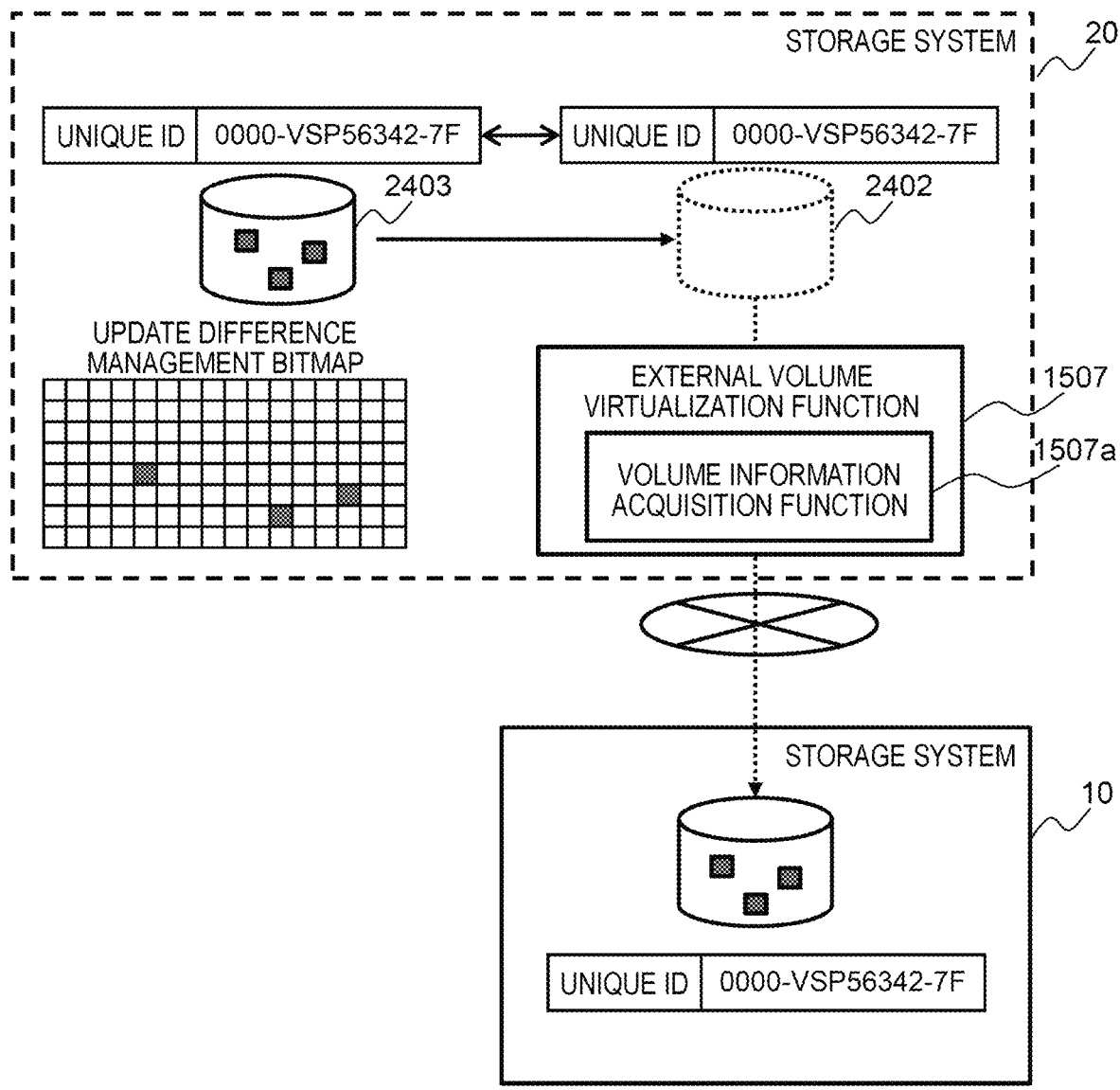
FIG. 28 is a diagram showing another example of the failback processing.

FIG. 28 is a diagram showing the modification of the second embodiment of the present disclosure, and more specifically, showing another example of the failback processing performed by the computer system.

In the example of FIG. 28, the volume information acquisition function 1507a provided in the external volume virtualization function 1507 of the storage system 20 acquires information on the volume of the storage system 10 from the storage system 10, and acquires, based on the information, the unique ID of the copy destination volume.

As described above, according to this embodiment, in the failback processing, a virtual volume obtained by mapping the copy destination volume is generated as a volume of the storage system 20, and update data is locally copied to the virtual volume. Therefore, only the data updated after the failover processing can be copied, thereby making it possible to shorten the time required for the failback processing.

Third Embodiment

In a third embodiment, processing different from the first embodiment will be mainly described.

Figure 29:
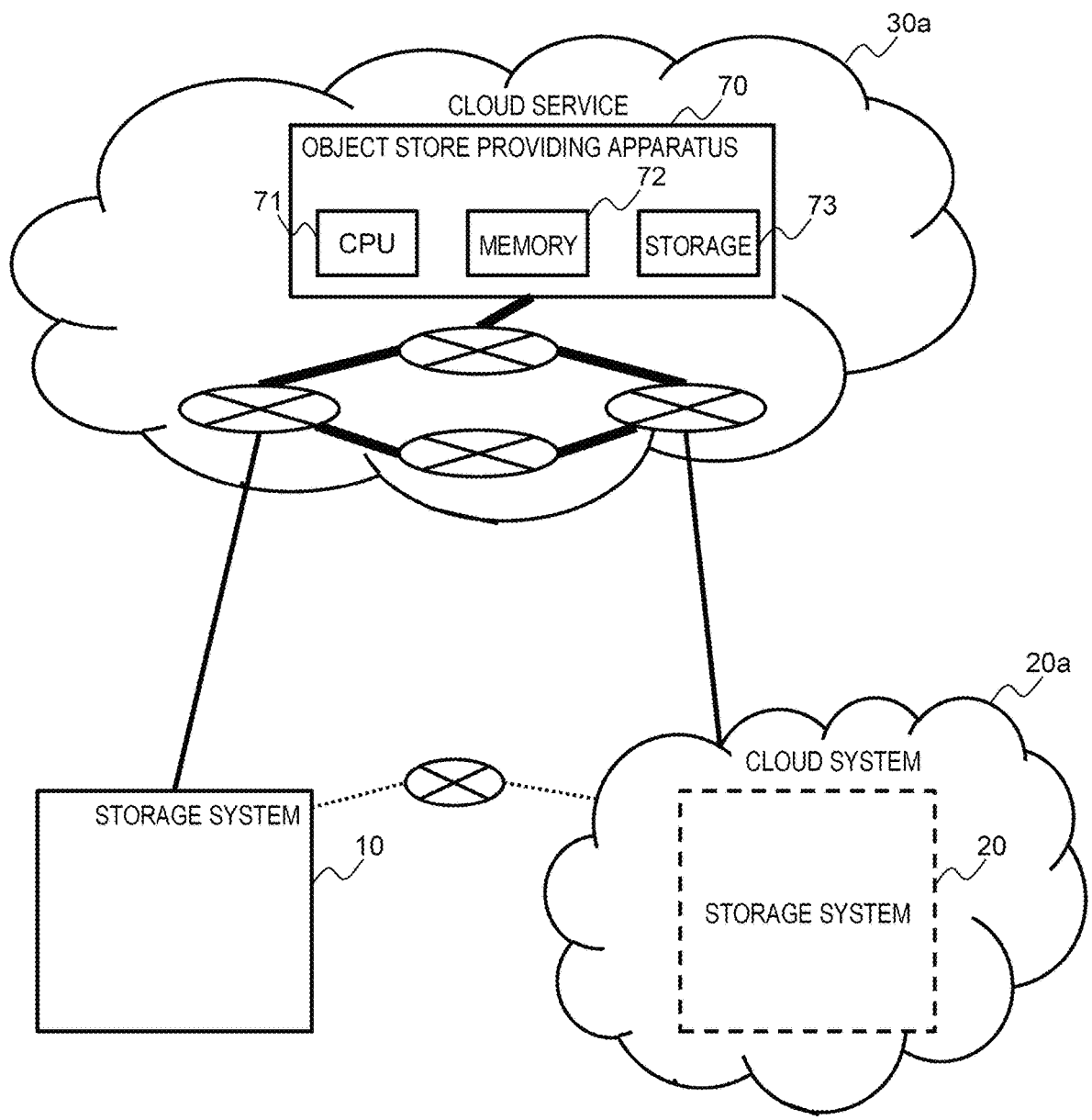
FIG. 29 is a diagram showing a computer system according to a third embodiment of the present disclosure.

FIG. 29 is a diagram showing a computer system according to the third embodiment of the present disclosure. In the computer system shown in FIG. 29, an object store providing apparatus 70 configured to provide an object store service is shown instead of the operation management system 30. It is noted that the operation management system 30 is not shown in the drawing, but the same exists in the same way as in the first embodiment.

The object store providing apparatus 70 includes a CPU 71, which is a processor configured to execute programs and perform various processing, a memory 72 configured to store programs and various information, and one or more storages 73 forming an object store. The CPU 301 reads a program recorded in the memory 302, executes the read program, performs various processing, and provides various object store services. The storage 73 is an object storage.

FIGS. 30 and 31 are flowcharts showing an example of failback processing in this embodiment. FIG. 30 shows processing for the storage system 20, and FIG. 31 is a flowchart showing processing for the storage system 10. Here, the processing for the storage system 10 is executed after the processing for the storage system 20.

In the failback processing, the operation management system 30 first stops the virtual machine 21 functioning as a host of the storage system 20 (step S801). The operation management system 30 fixes an update difference management bitmap (step S802). The operation management system 30, based on the fixed update difference management bitmap, generates update data updated after the failover processing as a backup of restoration target data to be restored in the failover processing, and further generates metadata for the backup data (step S803).

The operation management system 30 converts the generated backup data and metadata into object data, and stores the backup data of the data to be restored in an object store (here, object store configured by the storage 73) (step S804). The operation management system 30 generates catalog data (refer to FIG. 33) that manages the generated backup data as the latest backup generation of the data to be restored (step S805). The operation management system 30 stores the generated catalog data in the object store storing the backup data (step S806), and ends the processing for the storage system 20.

Then, the operation management system 30 displays a restoration data selection screen (refer to FIG. 32) configured to select the data to be restored on the terminal 17a or 17b (step S901). Thereafter, the operation management system 30 receives selection information on the selected data to be restored via the restoration data selection screen (step S902). The operation management system 30 then executes restoration processing of restoring the selected list target data (step S903). For example, this restoration processing is similar to the restoration processing described with reference to FIG. 17.

The operation management system 30 then starts the host 11 (step S904), and starts receiving an I/O request from the host 11 to the storage system 10 (step S905). The operation management system 30 then stops a virtual machine forming the storage system 20 (step S906), and ends the processing.

FIG. 32 is a diagram showing an example of the restoration data selection screen. A restoration data selection screen D40a shown in FIG. 32 includes selection fields D401 to D404, a restore button D411, and a cancel button D412, in the same manner as that of the restoration data selection screen D40 shown in FIG. 16. Here, the selection field D402 shows, as a selectable volume, a volume (SystemVolumeB_restored) of the storage system 20 in which the data of the volume of the storage system 10 is restored, in addition to the volume shown on the restoration data selection screen D40. By selecting this volume, the processing described with reference to FIG. 31 is executed.

FIG. 33 is a diagram showing an example of catalog data. Catalog data C23c shown in FIG. 33 is an example of the catalog data generated in step S805 of FIG. 30.

In FIG. 33, the latest backup generation at the time of failover is set to be the second generation managed by the catalog data C23 shown in FIG. 14. In this case, the catalog data C23 manages the backup generation of the backup data stored in step S804 of FIG. 30 as a third generation, and points to the catalog data C23 that manages the second generation as a parent catalog. As a result, the update data can be transmitted to the storage system 10 by the same processing as the restoration processing described with reference to FIG. 17.

As described above, according to this embodiment, in the failback processing, the CPU 301 of the operation management system 30 saves the update data in the object store storage as backup data of the data stored in the copy destination volume, and the same restores the data stored in the copy source volume to the copy destination volume based on the backup data. In this case as well, only update data is registered as backup data and restored, thereby making it possible to shorten the time required for the failback processing.

The above-described embodiments of the present disclosure are illustrative examples of the present disclosure, and are not intended to limit the scope of the present disclosure only to those embodiments. Those skilled in the art can implement the present disclosure in various other forms without departing from the scope of the present disclosure.

What is claimed is:

1. A computer system comprising:
a first storage system;
a second storage system; and
a management apparatus configured to manage the first storage system and the second storage system,
wherein the management apparatus includes a memory and a processor,
wherein the memory stores, for each first volume, identification information that uniquely identifies the first volume of the first storage system in the entire computer system, and
wherein the processor is configured to
in failover processing from the first storage system to the second storage system, restore data stored in the first volume to a second volume of the second storage system, associate the identification information of the first volume with the second volume, and store the identification information associated therewith in the memory,
manage update information indicating an updated content with respect to data stored in the second volume after the failover processing is completed, and
transmit, in failback processing from the second storage system to the first storage system, update data updated after the failover processing among the data stored in the second volume to the first volume identified by the identification information associated with the second volume based on the update information.

2. The computer system according to claim 1, wherein the processor is configured to
store backup data of the data stored in the first volume in a predetermined storage, and
restore, based on the backup data, the data, stop receiving an I/O request to the first volume, and restore the data stored in the first volume to a state of the backup data in the failover processing.

3. The computer system according to claim 1, wherein the processor determines, in the failback processing, whether the identification information of the selected first volume and the identification information associated with the second volume match each other, transmits, when the two pieces of identification information match each other, the update data to the first volume, and transmits, when the two pieces of identification information do not match each other, the entire data stored in the second volume to the first volume.

4. The computer system according to claim 1, wherein the processor transmits, in the failback processing, the update data to the first volume by remotely copying the update data to the first volume.

5. The computer system according to claim 1, wherein the processor generates, in the failback processing, a virtual volume obtained by mapping the first volume as a volume of the second storage system, and transmits the update data to the first volume by locally copying the update data to the virtual volume.

6. The computer system according to claim 1, wherein the processor is configured to
store backup data of the data stored in the first volume in a predetermined storage,
restore the data based on the backup data in the failover processing, and
in the failback processing, store the update data in a predetermined storage as the backup data of the data stored in the first volume, and transmit the update data to the first volume by restoring the data stored in the second volume to the first volume based on the backup data.

7. A data control method by a computer system including a first storage system, a second storage system, and a management apparatus configured to manage the first storage system and the second storage system,
wherein the management apparatus includes a memory and a processor,
wherein the memory stores, for each first volume, identification information that uniquely identifies the first volume of the first storage system in the entire computer system, and
wherein the processor is configured to
in failover processing from the first storage system to the second storage system, restore data stored in the first volume to a second volume of the second storage system, associate the identification information of the first volume with the second volume, and store the identification information associated therewith in the memory,
manage update information indicating an updated content with respect to data stored in the second volume after the failover processing is completed, and
transmit, in failback processing from the second storage system to the first storage system, update data updated after the failover processing among the data stored in the second volume to the first volume identified by the identification information associated with the second volume based on the update information.

* * * * *